United States Patent
Noguchi et al.

(10) Patent No.: US 11,402,682 B2
(45) Date of Patent: Aug. 2, 2022

(54) TOUCH SENSOR DEVICE

(71) Applicant: Japan Display Inc., Tokyo (JP)

(72) Inventors: Koji Noguchi, Kanagawa (JP); Daisuke Takama, Kanagawa (JP); Yoshitoshi Kida, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/927,599

(22) Filed: Jul. 13, 2020

(65) Prior Publication Data

US 2020/0341571 A1 Oct. 29, 2020

Related U.S. Application Data

(63) Continuation of application No. 16/016,055, filed on Jun. 22, 2018, now Pat. No. 10,768,755, which is a (Continued)

(30) Foreign Application Priority Data

Mar. 28, 2008 (JP) .................................. 2008-087739

(51) Int. Cl.
*G06F 3/044* (2006.01)
*G02F 1/1333* (2006.01)
(Continued)

(52) U.S. Cl.
CPC .... *G02F 1/13338* (2013.01); *G02F 1/134363* (2013.01); *G06F 3/044* (2013.01);
(Continued)

(58) Field of Classification Search
CPC ........... G02F 1/13338; G02F 1/134363; G02F 1/134372; G02F 2201/12; G06F 3/0412;
(Continued)

(56) References Cited

U.S. PATENT DOCUMENTS 4,733,370 A * 3/1988 Kitajima ................ G11C 7/005
365/108
7,656,393 B2 * 2/2010 King ................... G06F 3/04883
345/169
(Continued)

FOREIGN PATENT DOCUMENTS

JP 56-135276 10/1981
JP S59216177 12/1984
(Continued)

OTHER PUBLICATIONS

Japanese Patent Office Action dated Oct. 9, 2012 corresponding to Japanese patent application No. 2011-152880.
(Continued)

*Primary Examiner* — Jose R Soto Lopez
(74) *Attorney, Agent, or Firm* — Dentons US LLP

(57) ABSTRACT

A common electrode for a display, which is originally provided in a liquid crystal display element, is also used as one (drive electrode) of a pair of electrodes for a touch sensor, and the other (detection-electrode-for-the-sensor) of the pair of electrodes is newly formed. An existing common drive signal as a drive signal for display is used in common for a drive signal for the touch sensor. A capacitance is formed between the common electrode and the detection-electrode-for-the-sensor, and touch detection is performed by utilizing a change of this capacitance caused by a finger touch of a user. Thus, a display device with a touch sensor is also applicable to a mobile device in which electric potential of the user is inconstant in many cases. The newly-provided electrode is only the detection-electrode-for-the-sensor, and it is unnecessary to newly prepare a drive signal for the touch sensor.

15 Claims, 17 Drawing Sheets

Related U.S. Application Data continuation of application No. 15/226,192, filed on Aug. 2, 2016, now Pat. No. 10,037,116, which is a continuation of application No. 14/302,481, filed on Jun. 12, 2014, now Pat. No. 9,542,047, which is a continuation of application No. 12/601,310, filed as application No. PCT/JP2009/055949 on Mar. 25, 2009, now Pat. No. 8,786,557.

(51) Int. Cl.
*G02F 1/1343* (2006.01)
*G06F 3/041* (2006.01)
*G09G 3/36* (2006.01)

(52) U.S. Cl.
CPC .......... *G06F 3/0412* (2013.01); *G06F 3/0443* (2019.05); *G06F 3/0445* (2019.05); *G06F 3/0446* (2019.05); *G02F 1/134372* (2021.01); *G02F 2201/12* (2013.01); *G09G 3/3648* (2013.01)

(58) Field of Classification Search
CPC ...... G06F 3/044; G06F 3/0443; G06F 3/0445; G06F 3/0446; G06F 2203/04107; G09G 3/3648
See application file for complete search history.

(56) References Cited

U.S. PATENT DOCUMENTS

| | | | | |
|---|---|---|---|---|
| 8,525,798 | B2* | 9/2013 | Peterson | G06F 3/04166 345/173 |
| 8,552,989 | B2* | 10/2013 | Hotelling | G06F 3/0444 345/173 |
| 8,786,557 | B2* | 7/2014 | Noguchi | G06F 3/0443 345/173 |
| 2001/0018809 | A1* | 9/2001 | Heropoulos | G09F 13/22 40/544 |
| 2001/0024184 | A1* | 9/2001 | Maeda | G02F 1/134363 345/87 |
| 2004/0217945 | A1* | 11/2004 | Miyamoto | G06F 3/0443 345/173 |
| 2005/0275415 | A1* | 12/2005 | Sato | G06F 3/046 324/662 |
| 2007/0008299 | A1* | 1/2007 | Hristov | G06F 3/0443 345/173 |
| 2007/0030255 | A1* | 2/2007 | Pak | G06F 3/0445 345/173 |
| 2007/0063987 | A1* | 3/2007 | Sato | G06F 3/03547 345/173 |
| 2007/0146267 | A1* | 6/2007 | Jang | G02F 1/1347 348/E13.033 |
| 2007/0159467 | A1* | 7/2007 | Kim | G06F 3/0416 345/173 |
| 2007/0216657 | A1* | 9/2007 | Konicek | G06F 3/0443 345/173 |
| 2007/0257894 | A1* | 11/2007 | Philipp | G06F 3/0443 345/173 |
| 2008/0007539 | A1* | 1/2008 | Hotelling | G06F 3/0443 345/173 |
| 2008/0047764 | A1* | 2/2008 | Lee | G06F 3/0418 178/18.06 |
| 2008/0048989 | A1* | 2/2008 | Yoon | G02F 1/167 345/173 |
| 2008/0048990 | A1* | 2/2008 | Cho | G06F 3/0416 345/173 |
| 2008/0055221 | A1* | 3/2008 | Yabuta | G09G 3/3611 345/90 |
| 2008/0062140 | A1* | 3/2008 | Hotelling | G06F 3/0443 345/173 |
| 2008/0100592 | A1* | 5/2008 | Shigeno | G06F 3/0446 345/174 |
| 2008/0136764 | A1* | 6/2008 | Kim | G09G 3/3655 345/92 |
| 2008/0180584 | A1* | 7/2008 | Utsunomiya | G06F 3/0443 349/12 |
| 2008/0198140 | A1* | 8/2008 | Kinoshita | G06F 3/042 345/173 |
| 2008/0218650 | A1* | 9/2008 | Koshihara | G02F 1/136213 349/39 |
| 2008/0224971 | A1* | 9/2008 | Utsunomiya | G06F 3/0446 345/87 |
| 2008/0264699 | A1* | 10/2008 | Chang | G06F 3/0446 178/18.01 |
| 2008/0309627 | A1* | 12/2008 | Hotelling | G06F 3/044 345/173 |
| 2009/0040191 | A1* | 2/2009 | Tong | G06F 3/0446 345/174 |
| 2009/0046077 | A1* | 2/2009 | Tanaka | G06F 3/0444 345/174 |
| 2009/0051670 | A1* | 2/2009 | Wang | G02F 1/13338 345/174 |
| 2009/0091551 | A1* | 4/2009 | Hotelling | G06F 3/0446 455/566 |
| 2009/0096759 | A1* | 4/2009 | Nishiwaki | G06F 3/0444 345/173 |
| 2009/0096760 | A1* | 4/2009 | Ma | G06F 3/0446 345/174 |
| 2009/0153438 | A1* | 6/2009 | Miller | G06F 3/0488 345/55 |
| 2009/0194344 | A1* | 8/2009 | Harley | G06F 3/0446 178/18.06 |
| 2010/0071459 | A1* | 3/2010 | Kamm | G01D 5/24 73/304 C |
| 2010/0090979 | A1* | 4/2010 | Bae | G06F 3/0448 345/173 |

FOREIGN PATENT DOCUMENTS

| | | |
|---|---|---|
| JP | 60-006925 | 1/1985 |
| JP | 09-120334 | 5/1997 |
| JP | 2000-148376 | 5/2000 |
| JP | 2006-146895 | 6/2006 |
| JP | 2008-009750 | 1/2008 |
| JP | 2009-540374 | 11/2009 |
| WO | WO/2006/030745 | 3/2006 |
| WO | WO/2007/102238 | 9/2007 |
| WO | WO/2007/146780 | 12/2007 |

OTHER PUBLICATIONS

International Search Report dated Jun. 2, 2009.
USPTO Office Action issued in connection with related U.S. Appl. No. 14/168,871 dated Sep. 17, 2014.
Japanese Office Examination Report issued in connection with related Japanese Patent Application No. JP 2014-165275 dated Dec. 1, 2015.
Japanese Office Examination Report issued in connection with related Japanese Patent Application No. JP 2014-165275 dated Aug. 4, 2015.

* cited by examiner

TOUCH SENSOR DEVICE

RELATED APPLICATION DATA

This application is a continuation of U.S. patent application Ser. No. 16/016,055 filed Jun. 22, 2018, which is a continuation of U.S. patent application Ser. No. 15/226,192 filed Aug. 2, 2016, now U.S. Pat. No. 10,037,116 issued Jul. 31, 2018, which is a continuation of U.S. patent application Ser. No. 14/302,481 filed Jun. 12, 2014, now U.S. Pat. No. 9,542,047 issued Jan. 10, 2017, which is a continuation of U.S. patent application Ser. No. 12/601,310 filed Nov. 23, 2009, now U.S. Pat. No. 8,786,557 issued on Jul. 22, 2014, which is a 371 National Stage of PCT/JP2009/055949 filed Mar. 25, 2009, the entireties of which are incorporated herein by reference to the extent permitted by law. The present application claims the benefit of priority to Japanese Patent Application No. JP 2008-087739 filed on Mar. 28, 2008 in the Japan Patent Office, the entirety of which is incorporated by reference herein to the extent permitted by law.

TECHNICAL FIELD

The present invention relates to a display device such as a liquid crystal display device, and particularly relates to a display device with a touch sensor, which includes a touch sensor of capacitance type capable of inputting information by being touched with a user's finger or the like.

BACKGROUND ART

In recent years, a display device capable of inputting information by being provided with a contact detection device (hereinafter, referred to as a touch sensor), a so-called touch panel, directly mounted on a liquid crystal display device, and displaying various buttons on the liquid crystal display device, in substitution for typical buttons, has attracted attention. In the tendency that screens of mobile devices increase in size, this technique enables common arrangement of a display and buttons, and this brings a great merit such as space saving and reduction in the number of parts. However, in this technique, there is an issue that the thickness of a whole liquid crystal module increases, since the touch panel is mounted. In particular, in the application to the mobile devices, since a protective layer is necessary for preventing scratches on the touch panel, there is an issue that the thickness of the liquid crystal module tends to increase more and more, and this goes against the trend of thinning.

Thus, for example, in Patent document 1, proposed is a liquid crystal display element with a touch panel, in which a conductive film for the touch panel is provided between a substrate on an observation side of the liquid crystal display element and a polarizing plate for observation arranged on an outer surface of the substrate on the observation side, and the touch panel of a capacitance type, using an outer surface of the polarizing plate as a touch face, is formed between this conductive film for the touch panel and the outer surface of the polarizing plate. Thereby, thinning is realized.

Patent document 1: Japanese Unexamined Patent Application Publication No. 2008-9750

DISCLOSURE OF THE INVENTION

However, in the liquid crystal display element with the touch panel disclosed in Patent document 1, it is theoretically necessary for the conductive film for the touch panel to have electric potential identical to that of a user, and it is necessary for the user to be property grounded. Thus, although the application to stationary television receivers which take electric power source from outlets or the like is not an issue, it is practically difficult to apply the liquid crystal display element with the touch panel to mobile devices. Moreover, in the technique described above, since it is necessary for the conductive film for the touch panel to be extremely close to the user's finger, an arrangement region of the conductive film for the touch panel is limited, and it is difficult to dispose the conductive film for the touch panel in, for example, a portion deep inside the liquid crystal display element. That is, design flexibility is low. Moreover, in the technique described above, because of the configuration, a circuit section such as a touch panel drive section and a coordinate detection section is necessarily provided, separately from a display drive circuit section of the liquid crystal display element, and it is difficult to integrate the circuits of the whole device.

In view of the foregoing, it is a first object of the present invention to provide a display device with a touch sensor particularly suitable for a mobile-device application. It is a second object of the present invention to provide the display device with the touch sensor having high design flexibility. It is a third object of the present invention to provide the display device with the touch sensor having a configuration in which circuits are easily integrated.

A display device with a touch sensor of the present invention includes: a plurality of display pixel electrodes; a common electrode facing the display pixel electrode; a display function layer having an image display function; a display control circuit performing an image display control through applying a voltage for display between each of the display pixel electrode and the common electrode, based on an image signal, so that the display function of the display function layer is exhibited; and a touch detection electrode disposed oppositely to the common electrode, or beside the common electrode, the touch detection electrode and the common electrode forming a capacitance therebetween.

In the display device with the touch sensor of the present invention, the capacitance is formed between the common electrode which is originally provided for application of the drive voltage for display, and the touch detection electrode which is newly provided. This capacitance changes depending on presence or absence of a contact by an object. Therefore, when the drive voltage for display applied to the common electrode by the display control section is utilized (also used) as a drive signal for the touch sensor, a detection signal in accordance with the change of the capacitance is obtained from the touch detection electrode. When this detection signal is input to the touch detection circuit, it is possible to detect presence or absence of the contact by the object. Moreover, when the touch detection electrode is divided to a plurality of electrode patterns, and the plurality of electrode patterns are individually driven, it is possible to detect the contact position of the object. As the display function layer, for example, a liquid crystal layer is used.

In the display device with the touch sensor of the present invention, such a configuration is possible that an opposed substrate facing a circuit substrate in which the display control circuit is formed is disposed, the display pixel electrode is disposed on a side close to the opposed substrate, on the circuit substrate, the common electrode is disposed on a side close to the circuit substrate, on the opposed substrate, and the display function layer is disposed to be inserted between the display pixel electrode in the circuit substrate and the common electrode on the opposed substrate. This configuration is suitable, for example, to the case where the display function layer is made of liquid crystal of TN (twisted nematic) mode, VA (vertical alignment) mode, or the like. In this case, the touch detection electrode is preferably formed on the facing electrode side, and the touch detection circuit is preferably formed in the circuit substrate.

Also, in the display device with the touch sensor of the present invention, such a configuration is possible that an opposed substrate facing the circuit substrate in which the display control circuit and is formed is disposed, the common electrode and the display pixel electrode are stacked in order with an insulating layer in between, on the circuit substrate, and the display function layer is disposed to be inserted between the display pixel electrode on the circuit substrate and the opposed substrate. This configuration is suitable to, for example, the case where the display function layer is made of liquid crystal of a so-called lateral electric field mode such as FFS (fringe field switching) mode. In this case, the touch detection electrode may be formed on the opposed substrate side, or the circuit substrate side. The touch detection circuit is preferably formed in the circuit substrate. In the case where the touch detection electrode is formed on the circuit substrate side, the common electrode may be disposed inside a display region in the circuit substrate, and the touch detection electrode may be formed to be an electrode layer in a layer level same as that of the common electrode, in a frame region surrounding the display region on the circuit substrate, away from the common electrode. In the case where the touch detection electrode is formed on the opposed substrate side, and the touch detection circuit is formed in the circuit substrate, a conductive path may be formed to connect between the touch detection electrode on the opposed substrate, and the touch detection circuit in the circuit substrate. Alternatively, a capacity coupling path may be formed to establish capacitive coupling between the touch detection electrode on the opposed substrate, and the touch detection circuit in the circuit substrate.

According to the display device with the touch sensor of the present invention, the capacitance is formed between the common electrode which is originally provided for application of the drive voltage for display, and the touch detection electrode which is newly provided, and the touch detection is performed by utilizing the change of the capacitance caused by the contact of the object (finger of the user). Thus, it is possible to obtain the display device with the touch sensor capable of being suitably applied even to a mobile device in which electric potential of the user is indefinite in many cases. In particular, when the existing drive voltage for display which is originally prepared to be applied to the common electrode for display is utilized (also used) as the drive signal for the touch sensor, it is possible to obtain the detection signal in accordance with the change of the capacitance, from the touch detection electrode, and thus it is unnecessary to prepare a new drive signal for the sensor. Moreover, when the touch detection electrode is divided to the plurality of electrode patterns, and the plurality of electrode patterns are individually driven, it is possible to detect the touched position.

Also, according to the display device with the touch sensor of the present invention, it may be arbitrarily selected whether the touch detection electrode is formed on the opposed substrate side, or on the pixel substrate side, in accordance with the type of the display function layer. Therefore, it is possible to obtain the display device with the touch sensor in which design flexibility is high.

Also, according to the display device with the touch sensor of the present invention, it is also possible to form the touch detection electrode on the circuit substrate side, depending on the type of the display function layer. Thus, in the configuration design, it is advantageous to form the touch detection circuit in the circuit substrate, and it becomes easy to integrally collect the circuit for display and the circuit for the sensor on one circuit substrate. That is, integration of the circuits is easy.

BEST MODES FOR CARRYING OUT THE INVENTION

Hereinafter, the best mode for carrying out the present invention (hereinafter, simply referred to as an embodiment) will be described in detail with reference to drawings.

Figure 1:
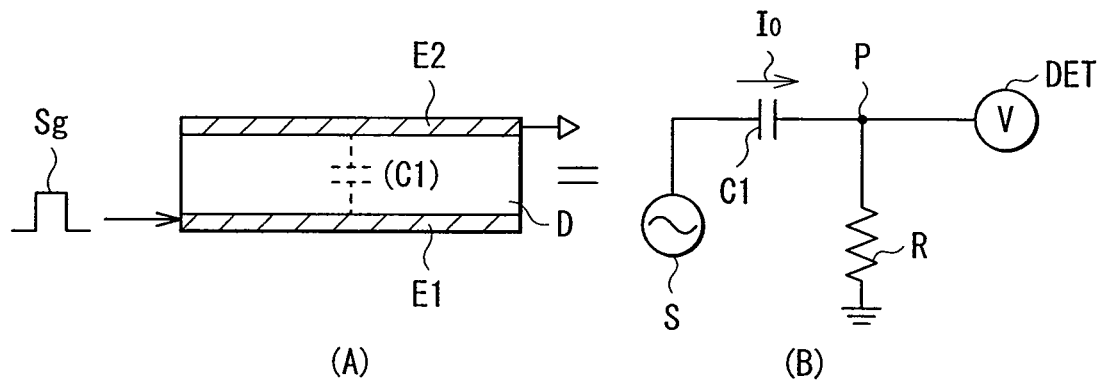
FIG. 1 Views for explaining an operational principle of a display device with a touch sensor according to the present invention, and views indicating a finger-untouched state.

First, with reference to FIGS. 1 to 3, the basic principle of a touch detection method in a display device with a touch sensor of the present embodiment will be described. This touch detection method is realized as a capacitance type touch sensor, and a capacitive element is configured by using a pair of electrodes (a drive electrode E1 and a detection electrode E2) facing each other with a dielectric D in between, as illustrated in FIG. 1(A). This configuration is illustrated as an equivalent circuit in FIG. 1(B). A capacitive element C1 is configured with the drive electrode E1, the detection electrode E2, and the dielectric D. In the capacitive element C1, one end is connected to an AC signal source S, and the other end P is grounded through a resistance R and connected to a voltage detector DET. When an AC rectangular wave Sg (FIG. 3(B)) with a predetermined frequency (for example, approximately several kHz to ten-odd kHz) is applied from the AC signal source S to the drive electrode E1 (one end of the capacitive element C1), an output waveform (detection signal Vdet) as illustrated in FIG. 3(A) appears in the detection electrode E2 (other end P of the capacitive element C1). In addition, this AC rectangular wave Sg corresponds to a common drive signal Vcom, which will be described later.

In a finger-untouched state, as illustrated in FIG. 1, with charge/discharge to the capacitive element C1, a current I0 in accordance with a capacity of the capacitive element C1 flows. At this time, the waveform of electric potential of the other end P in the capacitive element C1 is, for example, like a waveform V0 of FIG. 3(A), and this is detected with the voltage detector DET.

Figure 2:
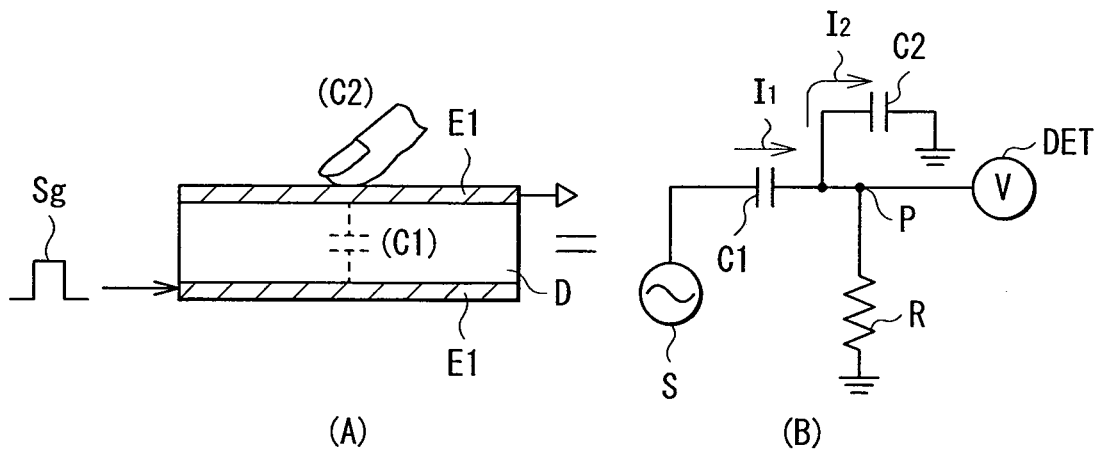
FIG. 2 Views for explaining an operational principle of the display device with the touch sensor according to the present invention, and views indicating a finger-touched state.
Figure 3:
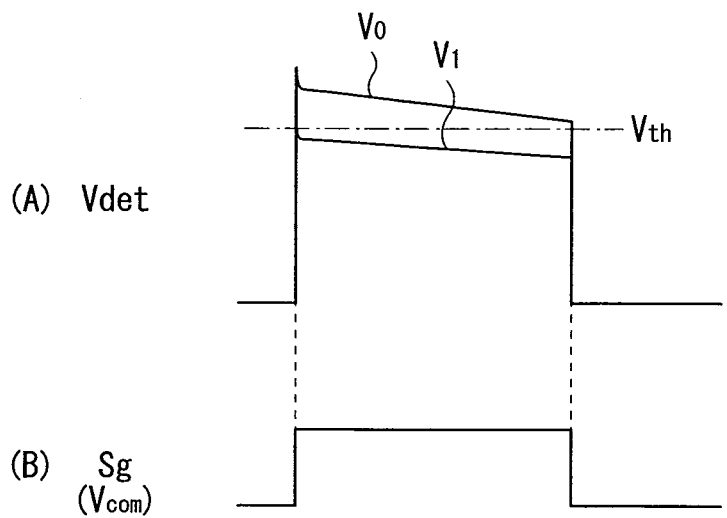
FIG. 3 A view for explaining an operational principle of the display device with the touch sensor according to the present invention, and a view indicating an example of a waveform of a drive signal and a detection signal of the touch sensor.

On the other hand, in a finger-touched state, as illustrated in FIG. 2, a capacitive element C2 formed by the finger is added in series to the capacitive element C1. In this state, with the charge/discharge to the capacitive elements C1 and C2, currents I1 and I2 flow, respectively. At this time, the waveform of the electric potential of the other end P in the capacitive element C1 is, for example, like a waveform V1 of FIG. 3(A), and this is detected with the voltage detector DET. At this time, the electric potential at the point P is an electric partial potential defined by the values of the currents I1 and I2 flowing through the capacitive elements C1 and C2, respectively. Therefore, the waveform V1 becomes a value smaller than that of the waveform V0 in the untouched state. As will be described later, the voltage detector DET compares the detected voltage with a predetermined threshold voltage Vth. When the detected voltage is equal to or smaller than the threshold voltage, the voltage detector DET determines that it is in the untouched state. On the other hand, when the detected voltage is equal to or larger than the threshold voltage, the detector DET determines that it is in the touched state. In this manner, it is possible to perform the touch detection.

First Embodiment

Figure 4:
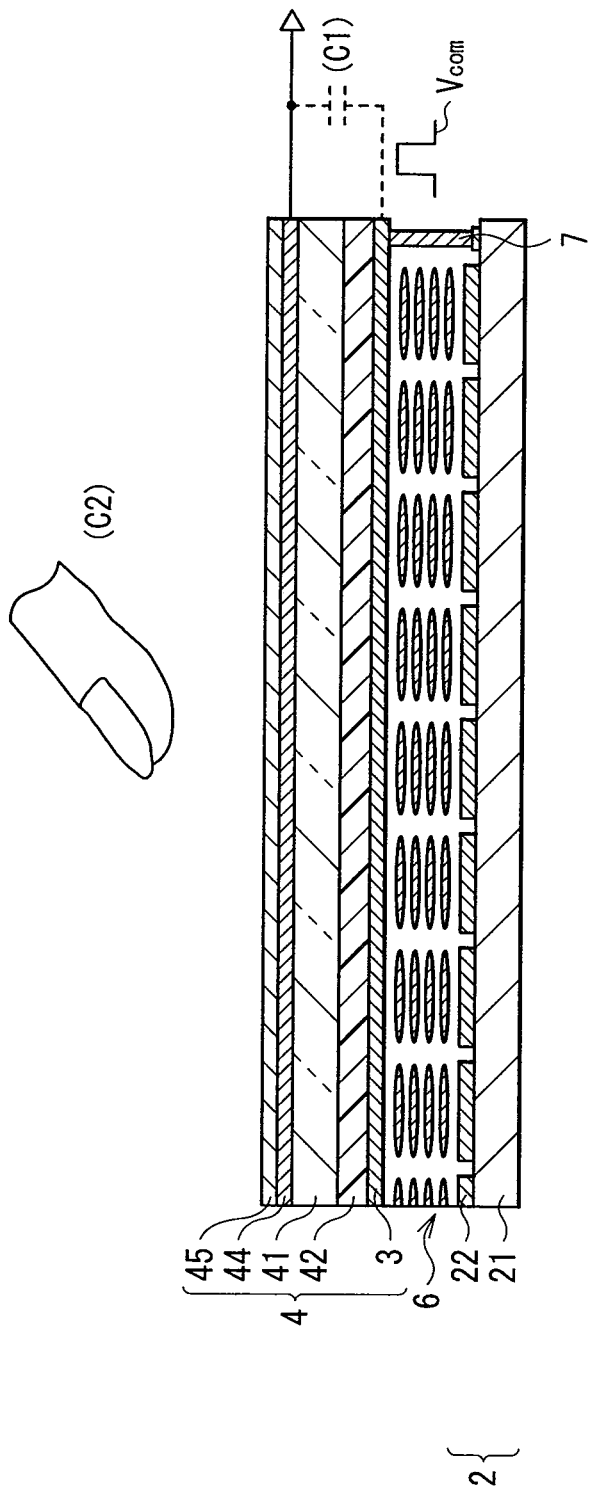
FIG. 4 A cross-sectional view illustrating the schematic cross-sectional configuration of the display device with the touch sensor according to a first embodiment of the present invention.

FIG. 4 illustrates the cross-sectional configuration of a main part of the display device with the touch sensor of the present embodiment. In this display device with the touch sensor, a liquid crystal display element is used as a display element, and a part of an electrode (common electrode 43, which will be described later) which is originally provided in this liquid crystal display element, and a drive signal for display (common drive signal Vcom, which will be described later) are used also for another purpose, thereby the capacitance type touch sensor is configured.

As illustrated in FIG. 4, the display device with the touch sensor includes a pixel substrate 2, an opposed substrate 4 facing this pixel substrate 2, and a liquid crystal layer 6 inserted between the pixel substrate 2 and the opposed substrate 4.

The pixel substrate 2 includes a TFT substrate 21 as a circuit substrate, and a plurality of pixel electrodes 22 disposed in a matrix form on this TFT substrate 21. In addition to a display driver and TFTs (thin film transistor), which are not illustrated in the figure, for driving each of the pixel electrodes 22, wirings such as a source line supplying a pixel signal to each of the pixel electrodes, and a gate line driving each of the TFTs are formed in the TFT substrate 21. Moreover, in the TFT substrate 21, a detection circuit (FIG. 6) performing touch detection operation, which will be described later, may also be formed.

The opposed substrate 4 includes a glass substrate 41, a color filter 42 formed on one surface of this glass substrate 41, and a common electrode 43 formed on this color filter 42. The color filter 42 is configured, for example, by aligning color filter layers of three colors, red (R), green (G), and blue (B), in a cycle, and a set of three colors of R, G, and B is assigned to each display pixel (pixel electrode 22). The common electrode 43 is also used as a drive electrode for the sensor which constitutes a part of the touch sensor performing the touch detection operation, and corresponds to the drive electrode E1 in FIG. 1.

The common electrode 43 is coupled to the TFT substrate 21 with a contact conductive pillar 7. The common drive signal Vcom having an AC rectangular waveform is applied from the TFT substrate 21 to the common electrode 43 through this contact conductive pillar 7. This common drive signal Vcom defines the pixel voltage applied to the pixel electrode 22 as well as a display voltage of each of the pixels, and is also used as the drive signal for the touch sensor. The common drive signal Vcom corresponds to the AC rectangular wave Sg supplied from the drive signal source S of FIG. 1.

On the other surface of the glass substrate 41, a detection-electrode-for-a-sensor 44 is formed. Moreover, on this detection-electrode-for-the-sensor 44, a polarizing plate 45 is disposed. The detection-electrode-for-the-sensor 44 constitutes a part of the touch sensor, and corresponds to the detection electrode E2 in FIG. 1.

The liquid crystal layer 6 modulates light passing through the liquid crystal layer 6, in accordance with the state of the electric field, and is made of liquid crystal of various modes, for example, TN (twisted nematic), VA (vertical alignment), and ECB (electrically controlled birefringence).

An alignment film is disposed between the liquid crystal layer 6 and the pixel substrate 2, and between the liquid crystal layer 6 and the opposed substrate 4, respectively. Although a polarizing plate on a light incident side is disposed below the pixel substrate 2, its illustration is omitted in the figure.

Figure 5:
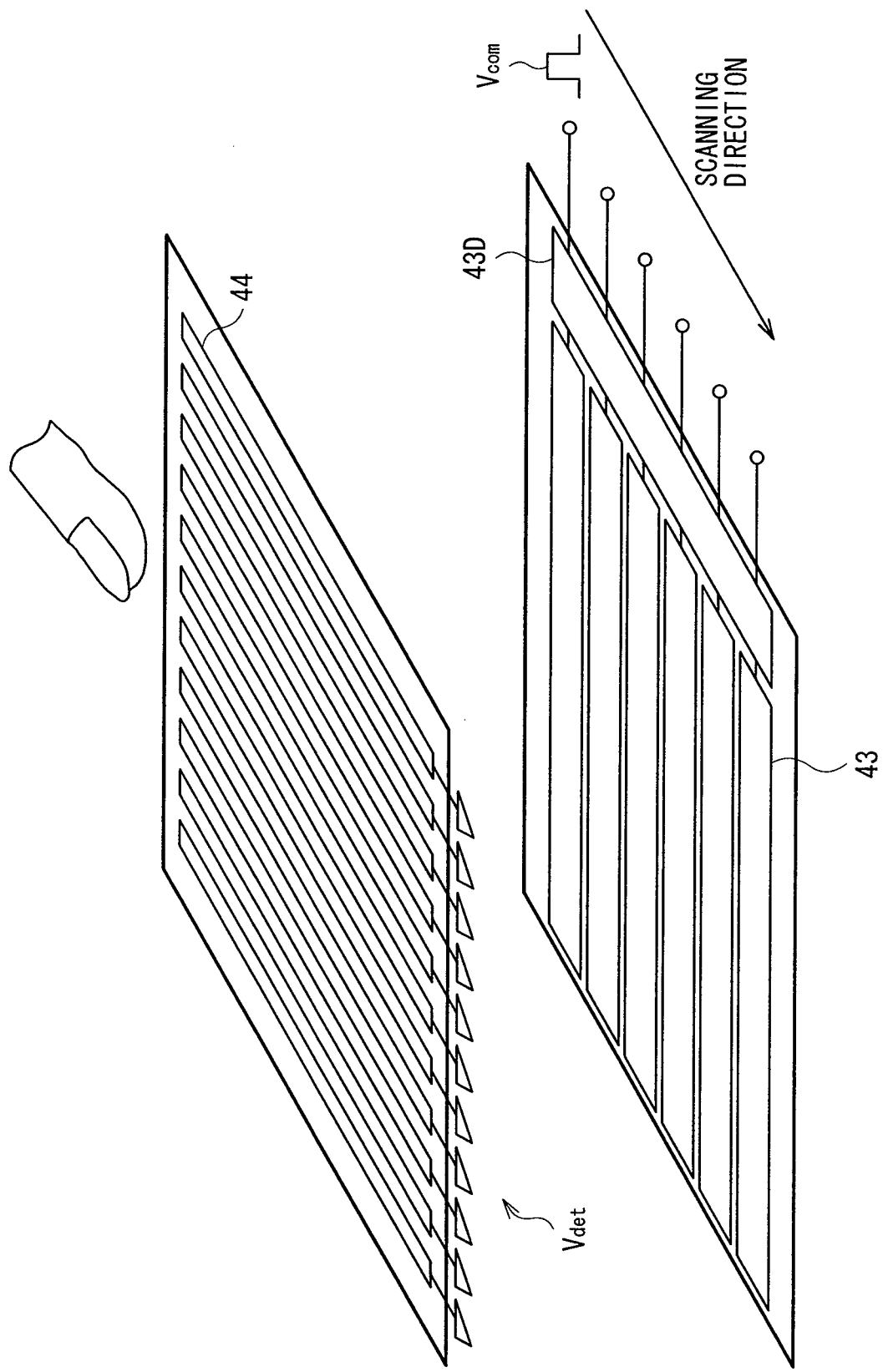
FIG. 5 A perspective view indicating an example of the configuration of a main part (a common electrode and a detection-electrode-for-a-sensor) of the display device with the touch sensor illustrated in FIG. 4.

FIG. 5 perspectively illustrates an example of the configuration of the common electrode 43 and the detection-electrode-for-the-sensor 44 in the opposed substrate 4. In this example, the common electrode 43 is divided to a plurality of stripe-shaped electrode patterns extending in the right-and-left direction of the figure. With a driver 43D, the common drive signal Vcom is sequentially supplied to each of the electrode patterns, and the line-sequential scanning drive is time-divisionally performed. On the other hand, the detection-electrode-for-the-sensor 44 is configured with a plurality of stripe-shaped electrode patterns extending in a direction orthogonal to the extending direction of the electrode patterns in the common electrode 43. The detection signal Vdet is output from each of the electrode patterns in the detection-electrode-for-the-sensor 44, and input to a detection circuit 8 illustrated in FIG. 6.

Figure 6:
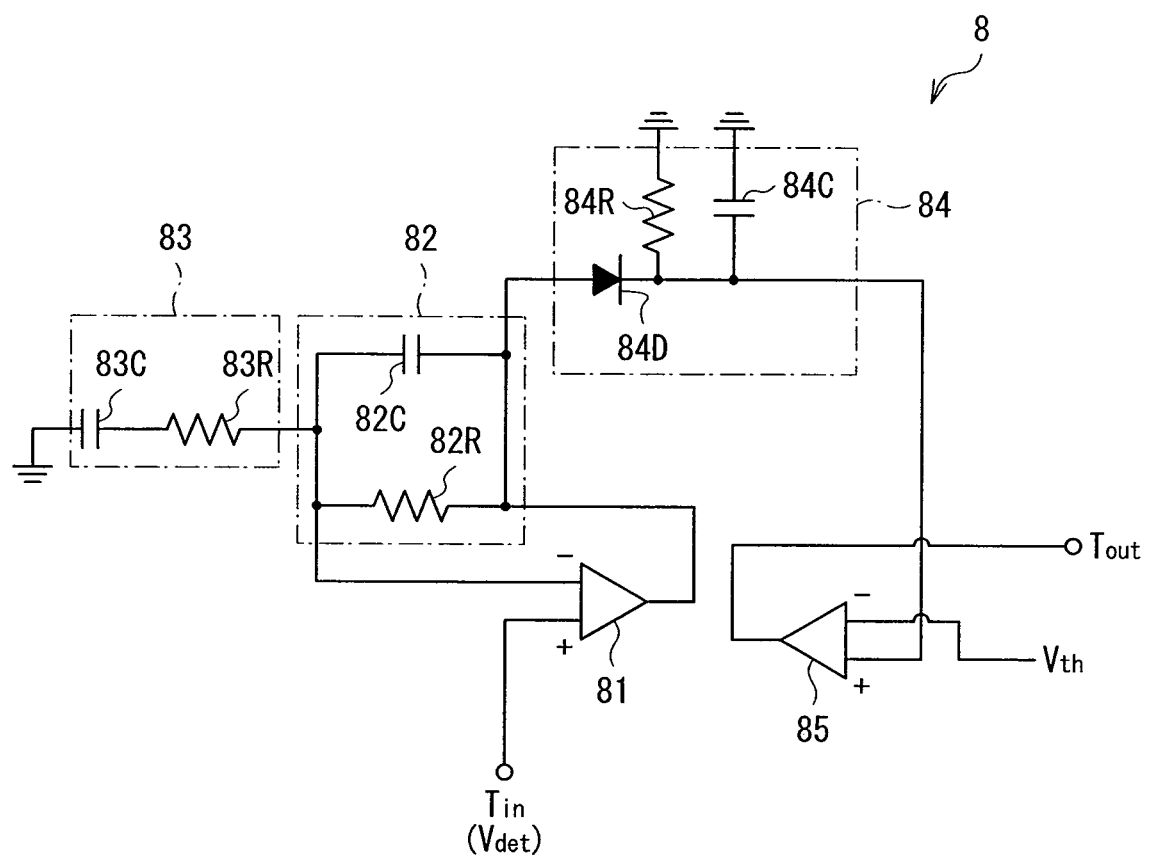
FIG. 6 A circuit view indicating an example of the configuration of a detection circuit in the display device with the touch sensor illustrated in FIG. 4.

FIG. 6 illustrates an example of the configuration of the detection circuit 8 performing the touch detection operation. This detection circuit 8 includes an operational amplifier 81 for signal amplification, a low pass filter (LPF) 82 which cuts a higher-frequency component, and allows a lower-frequency component to pass, and a high pass filter (HPF) 83 which allows the high-frequency component to pass, a rectifying smoothing section 84, and a comparator 85. An input terminal Tin is connected to a positive input terminal (+) of the operational amplifier 81, and the detection signal Vdet is input to the input terminal Tin. An output terminal of the operational amplifier 81 is connected to the rectifying smoothing section 84 through the LPF 82. The HPF 83 is connected to the LPF 82. The LPF 82 has the configuration in which a resistance 82R and a capacitor 82C are connected in parallel, and the HPF 83 has the configuration in which a resistance 83R and a capacitor 83C are connected in series between the ground and the LPF 82. A connection point of the LPF 82 and the HPF 83 is connected to a negative input terminal (−) of the operational amplifier 81. The rectifying smoothing section 84 includes a rectifying section made of a half-wave rectification diode 84D, and a smoothing section in which a resistance 84R and a capacitor 82C are connected in parallel between the ground and the half-wave rectification diode 84D. An output terminal of the rectifying smoothing section 84 is connected to a positive input terminal (+) of the comparator 85. The predetermined threshold voltage Vth (refer to FIG. 3) is input to a negative input terminal (−) of this comparator 85. An output terminal of the comparator 85 is connected to an output terminal Tout, and a detected result (touched or not) is output from the output terminal Tout.

The detection circuit 8 having such a configuration operates as follows. The detection signal Vdet input to the input terminal Tin is amplified with the operational amplifier 81. Then, the low-frequency component in the detection signal Vdet passes through the LPF 82, and the high-frequency component is removed through the HPF 83. The low-frequency AC element passing through the LPF 82 is half-wave rectified with the diode 84D in the rectifying smoothing section 84, and then smoothed to a level signal and input to the comparator 85. The comparator 85 compares the input level signal with the threshold voltage Vth. When the input level signal is equal to or smaller than the threshold voltage Vth, the comparator 85 outputs a touch detection signal.

The detection circuit 8 may be formed in a peripheral region (a non-display region or a frame region) on the opposed substrate 4. Alternatively, the detection circuit 8 may be formed in a peripheral region on the pixel substrate 2. However, when the detection circuit 8 is formed on the pixel substrate 2, integration of the detection circuit 8 and various circuit elements for display control or the like, which are originally formed on the pixel substrate 2, is realized, and this is preferable from a viewpoint of simplification of the circuit realized by the integration. In this case, each of the electrode patterns in the detection-electrode-for-the-sensor 44 and the detection circuit 8 of the pixel substrate 2 are connected with a contact conductive pillar (not illustrated in the figure) which is similar to the contact conductive pillar 7, and the detection signal Vdet may be transmitted from the detection-electrode-for-the-sensor 44 to the detection circuit 8.

Next, operation of the display device with the touch sensor having the above configuration will be described.

The display driver (not illustrated in the figure) in the pixel substrate 2 line-sequentially supplies the common drive signal Vcom to each of the electrode patterns in the common electrode 43. The display driver also supplies the pixel signal to the pixel electrode 22 through the source line, and line-sequentially controls switching of the TFT in each of the pixel electrodes through the gate line, in synchronization with the supply of the pixel signal. Thereby, the electric field is applied to the liquid crystal layer 6 for each pixel, in the longitudinal direction (direction perpendicular to the substrate) defined by the common drive signal Vcom and each of the pixel signals, and the liquid crystal state is modulated. In this manner, the display is performed with a so-called inversion drive.

On the other hand, on the opposed substrate 4 side, the capacitive element C1 is formed at each intersection portion of each of the electrode patterns in the common electrode 43 and each of the electrode patterns in the detection-electrode-for-the-sensor 44. When the common drive signal Vcom is time-divisionally sequentially applied to each of the electrode patterns in the common electrode 43, the charge/discharge is performed on each of the capacitive elements C1 of one line formed at the intersection portion of the electrode pattern in the common electrode 43, to which the common drive voltage Vcom is applied, and each of the electrode patterns in the detection-electrode-for-the-sensor 44. As a result, the detection signal Vdet with the magnitude in accordance with the capacity of the capacitive element C1 is output from each of the electrode patterns in the detection-electrode-for-the-sensor 44. Under the conditions where the user's finger is not in contact with the surface of the opposed substrate 4, the magnitude of this detection signal Vdet is approximately constant. A line of the capacitive elements C1 to be charged/discharged is line-sequentially shifted by the scanning with the common drive signal Vcom.

Here, when the user's finger touches any place on the surface of the opposed substrate 4, the capacitive element C2 by the finger is added to the capacitive element C1, which is originally formed in that touched place. As a result, the value of the detection signal Vdet when that touched place is scanned (that is, in the electrode patterns of the common electrode 43, when the common drive signal Vcom is applied to the electrode pattern which is corresponding to that touched place) becomes small, in comparison with the detection signal Vdet of other places. The detection circuit 8 (FIG. 6) compares this detection signal Vdet with the threshold voltage Vth. When the detection signal Vdet is equal to or smaller than the threshold voltage Vth, the detection circuit 8 determines that place as the touched place. This touched place may be determined with the application timing of the common drive signal Vcom, and the detection timing of the detection signal Vdet which is equal to or smaller than the threshold voltage Vth.

In this manner, according to the present embodiment, the capacitance type touch sensor has the configuration in which the common electrode 43, which is originally provided in the liquid crystal display element, is also used as one of the pair of electrodes for the touch sensor, including the drive electrode and the detection electrode, and the common drive signal Vcom as the drive signal for display is used in common for the drive signal for the touch sensor. Thus, the newly-provided electrode is only the detection-electrode-for-the-sensor 44, and it is unnecessary to newly prepare the drive signal for the touch sensor. Therefore, the configuration is simple.

Also, in the display device with the touch panel of the related art (Patent document 1), the magnitude of a current flowing through a sensor is accurately measured, and a touched position is determined with analogue computation, based on that measured value. On the other hand, in the present embodiment, the presence or absence of the relative change in the current (change in electric potential) in accordance with the presence or absence of the touch may be digitally detected, and it is possible to improve the detection accuracy with the simple detection circuit configuration. Moreover, the capacitance is formed between the common electrode 43, which is originally provided for application of the common drive signal Vcom, and the detection-electrode-for-the-sensor 44, which is newly provided, and the touch detection is performed by utilizing the change of this capacitance caused by the finger touch of the user. Thus, the display device with the touch panel may be applied even to a mobile device in which electric potential of the user is inconstant in many cases.

Also, since the detection-electrode-for-the-sensor 44 is divided to the plurality of electrode patterns, and the plurality of electrode patterns are individually time-divisionally driven, it is also possible to detect the touched position.

Figure 7:
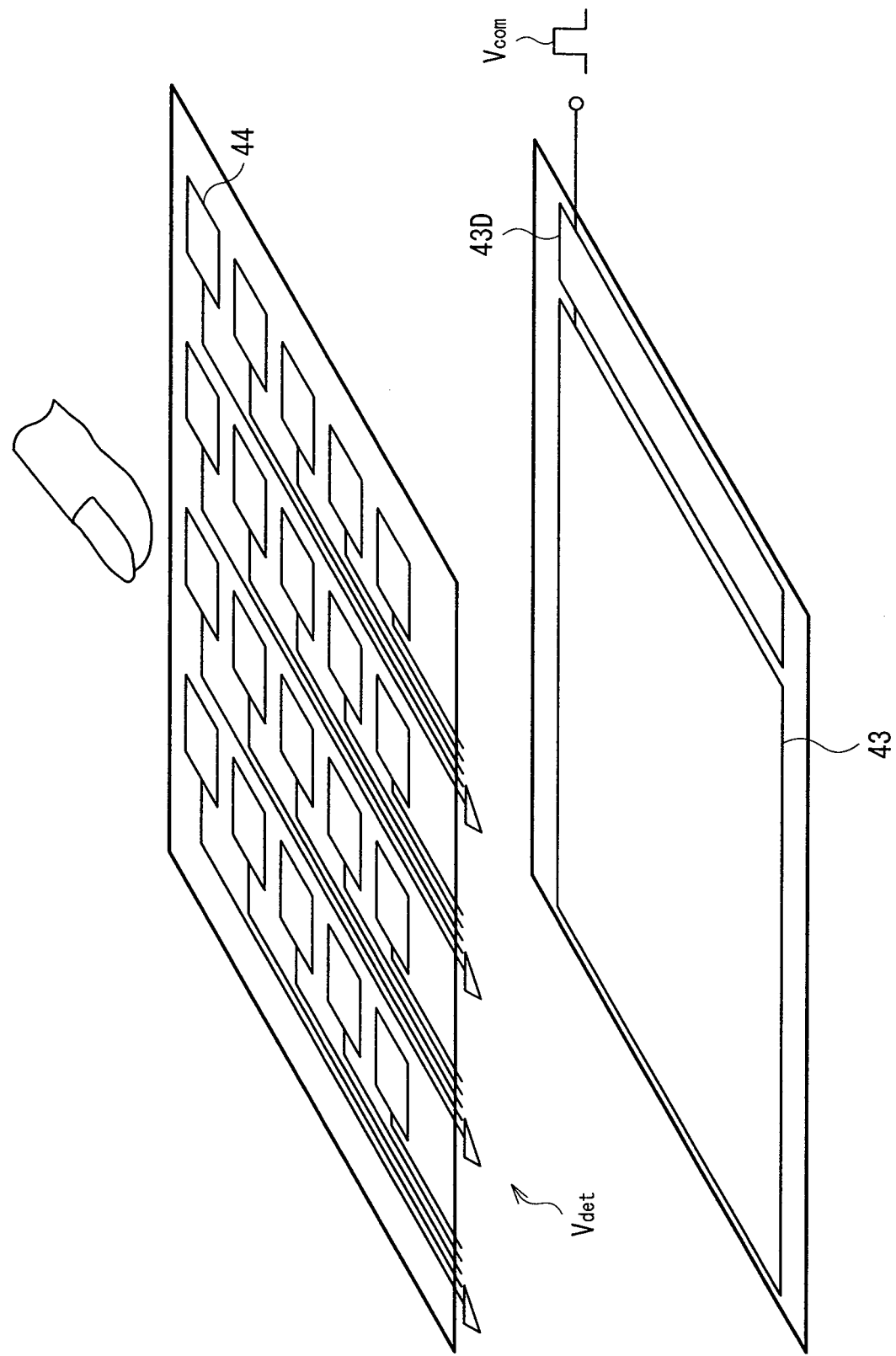
FIG. 7 A perspective view indicating another example of the configuration of the main part (the common electrode and the detection-electrode-for-the-sensor) of the display device with the touch sensor illustrated in FIG. 4.

In addition, in the above description, as illustrated in FIG. 5, although both the common electrode 43 and the detection-electrode-for-the-sensor 44 are formed as the plurality of electrode patterns extending so as to intersect each other, they are not limited to this. For example, as illustrated in FIG. 7, the common electrode 43 may be formed as a single electrode extending all over, and the detection-electrode-for-the-sensor 44 may be formed as a plurality of individual electrodes disposed in a matrix form. In this case, it is possible to immediately determine the touched position with the detection signal Vdet from each of the individual electrodes constituting the detection-electrode-for-the-sensor 44.

Figure 8:
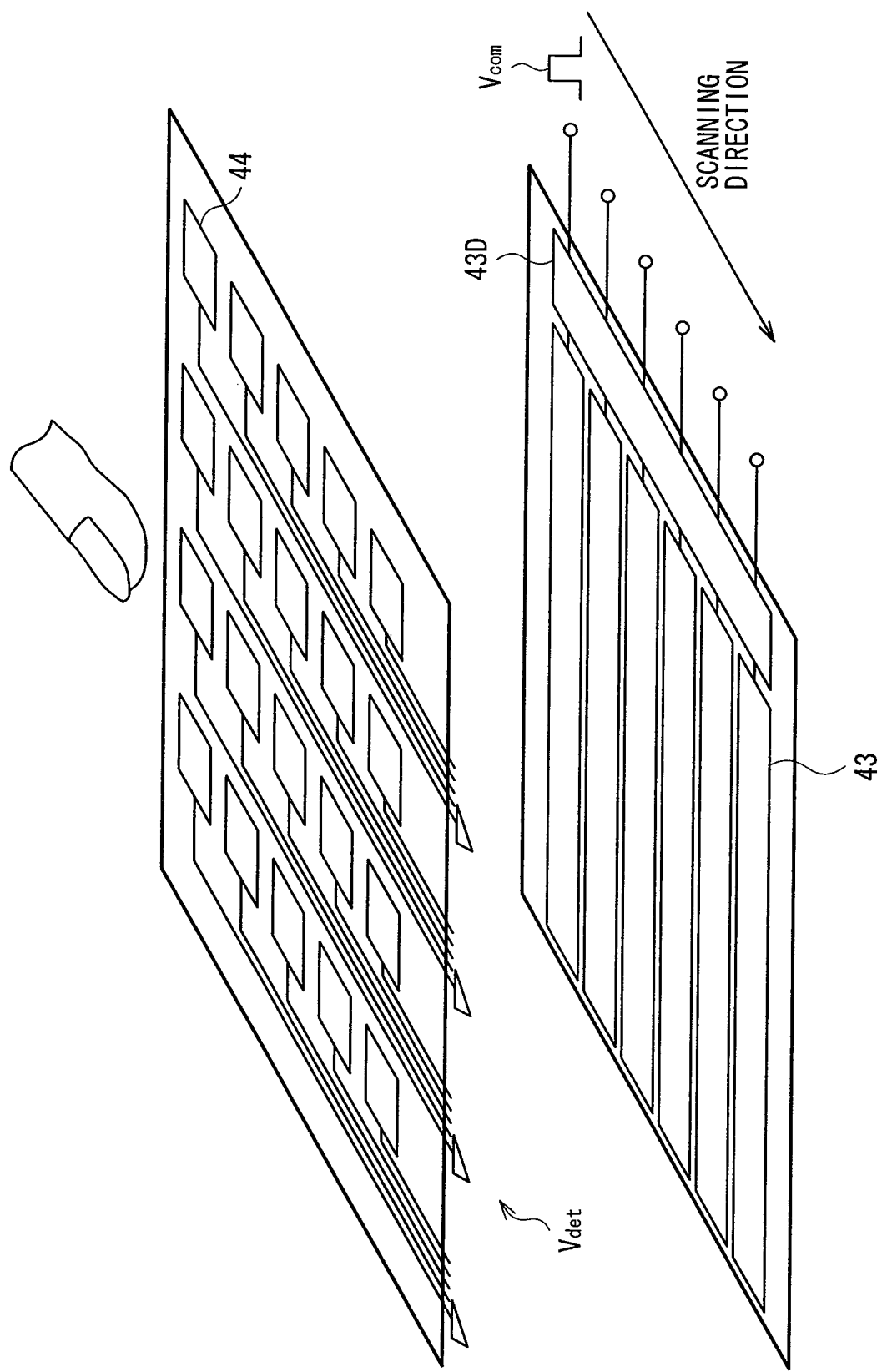
FIG. 8 A perspective view indicating still another example of the configuration of the main part (the common electrode and the detection-electrode-for-the-sensor) of the display device with the touch sensor illustrated in FIG. 4.

Alternatively, as illustrated in FIG. 8, the common electrode 43 may be formed as a plurality of electrode patterns divided in a stripe shape, similarly to FIG. 5, and the detection-electrode-for-the-sensor 44 may be formed as a plurality of individual electrodes disposed in a matrix form, similarly to FIG. 7. Also in this case, it is possible to perform the detection while sequentially scanning the plurality of electrode patterns in the common electrode 43 with the common drive signal Vcom.

Second Embodiment

Next, a second embodiment will be described. The present embodiment differs from the above-described first embodiment in that a liquid crystal element of a lateral electric field mode is used as a display element.

Figure 9:
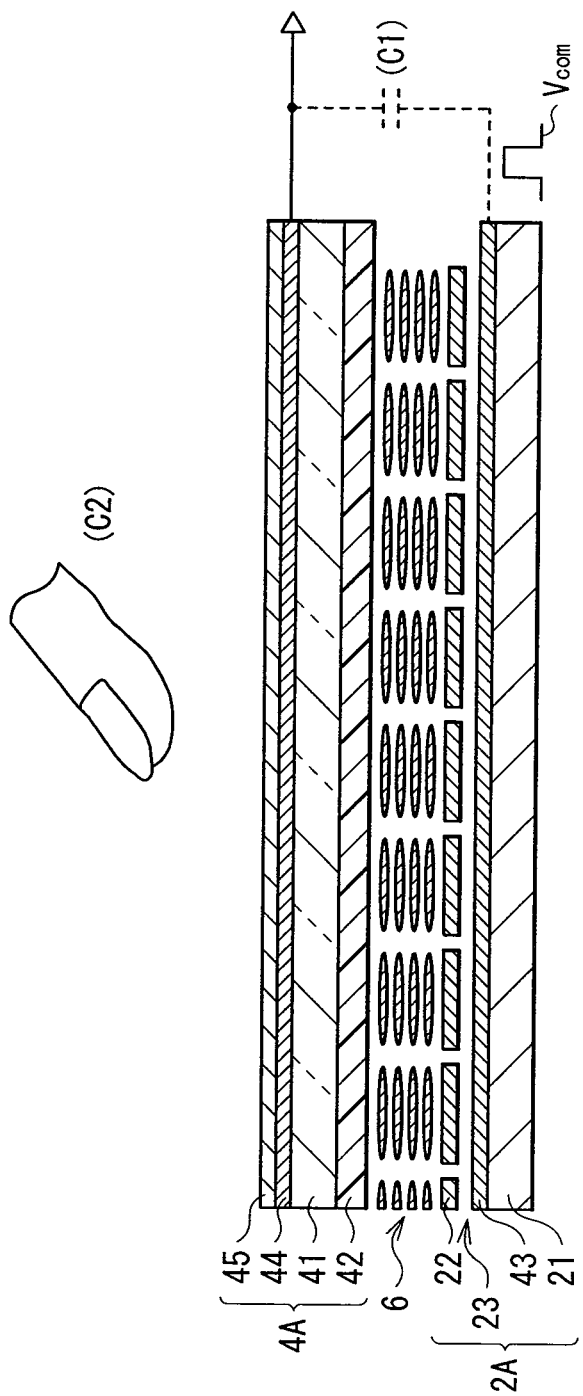
FIG. 9 A cross-sectional view illustrating the schematic cross-sectional configuration of the display device with the touch sensor according to a second embodiment of the present invention.
Figure 10:
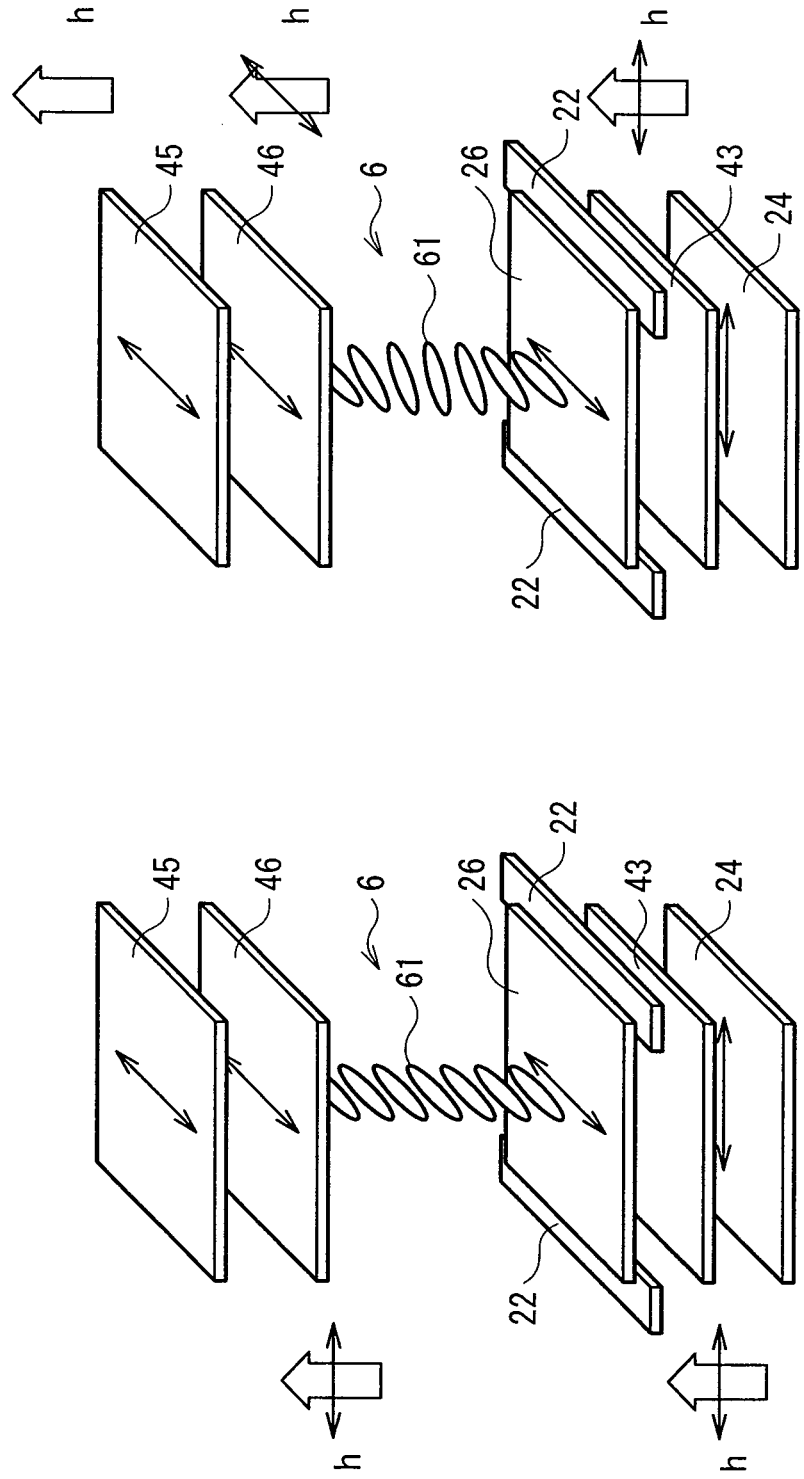
FIG. 10 Enlarged perspective views of the main part of the display device with the touch sensor illustrated in FIG. 9.

FIG. 9 illustrates the cross-sectional configuration of the main part of the display device with the touch sensor according to the present embodiment, and FIG. 10 illustrates its perspective configuration. In these views, same reference numerals as in FIG. 4 are used to indicate identical components, and thereby the description is appropriately omitted.

The display device with the touch sensor according to the present embodiment includes a pixel substrate 2A, an opposed substrate 4A facing this pixel substrate 2A, and the liquid crystal layer 6 inserted between the pixel substrate 2A and the opposed substrate 4A.

The pixel substrate 2A includes the TFT substrate 21, the common electrode 43 disposed on this TFT substrate 21, and the plurality of pixel electrodes 22 disposed in a matrix form on the this common electrode 43 with an insulating layer 23 in between. In addition to the display driver and the TFTs, which are not illustrated in the figure, for driving each of the pixel electrodes 22, wirings such as the source line supplying the pixel signal to each of the pixel electrodes, and the gate line driving each of the TFTs are formed in the TFT substrate 21. Moreover, the detection circuit (FIG. 6) performing the touch detection operation is formed in the TFT substrate 21. The common electrode 43 is also used as the driving electrode for the sensor which constitutes a part of the touch sensor performing the touch detection operation, and corresponds to the driving electrode E1 in FIG. 1.

The opposed substrate 4A includes the glass substrate 41, and the color filter 42 formed on one surface of this glass substrate 41. On the other surface of the glass substrate 41, the detection-electrode-for-the-sensor 44 is formed. Moreover, on this detection-electrode-for-the-sensor 44, the polarizing plate 45 is disposed. The detection-electrode-for-the-sensor 44 constitutes a part of the touch sensor, and corresponds to the detection electrode E2 in FIG. 1. The detection-electrode-for-the-sensor 44 is divided to the plurality of electrode patterns, as illustrated in FIG. 5, FIG. 7 or FIG. 8. The detection-electrode-for-the-sensor 44 may be formed directly on the opposed substrate 4A, through the use of thin film process, or may be formed indirectly. In this case, a touch detection electrode 44 is formed on a film substrate which is not illustrated in the figure, and the film substrate on which this touch detection electrode 44 is formed may be attached to the surface of the opposed substrate 4A. In this case, it is possible to attach the film substrate to not only between the glass and the polarizing plate, but also the top surface of the polarizing plate. The film substrate may be formed in a film constituting the polarizing plate.

The common drive signal Vcom having the AC rectangular waveform is applied from the TFT substrate 21 to the common electrode 43. This common drive signal Vcom defines the pixel voltage applied to the pixel electrode 22 as well as the display voltage of each of the pixels, and is also used as the drive signal for the touch sensor. The common drive signal Vcom corresponds to the AC rectangular wave Sg supplied from the drive signal source S of FIG. 1.

The liquid crystal layer 6 modulates the light passing through the liquid crystal layer 6, in accordance with the state of the electric field, and is made of liquid crystal of a lateral electric field mode, for example, FFS (fringe field switching) mode, and IPS (in-plane switching) mode.

The configurations of the common electrode 43 in the pixel substrate 2A, and the detection-electrode-for-the-sensor 44 in the opposed substrate 4A are, for example, similar to those illustrated in FIG. 5, and both the common electrode 43 and the detection-electrode-for-the-sensor 44 are formed as the plurality of electrode patterns extending so as to intersect each other. However, the configurations of the common electrode 43 and the detection-electrode-for-the-sensor 44 may be similar to those illustrated in FIG. 7 or FIG. 8 described above.

With reference to FIG. 10, a more detailed description will be made. In the liquid crystal element of FFS mode as indicated here, the pixel electrode 22 patterned in a comb shape is disposed on the common electrode 43 formed on the pixel substrate 2A, with the insulating layer 23 in between, and an alignment film 26 covering the pixel electrode 22 is formed. Between this alignment film 26 and an alignment film 46 on the opposed substrate 4A side, the liquid crystal layer 6 is supported. Two polarizing plates 24 and 45 are disposed in the state of cross-nichols. The rubbing direction of the two alignment films 26 and 46 corresponds to the transmission axis of one of the two polarizing plates 24 and 25. In FIG. 10, the case where the rubbing direction corresponds to the transmission axis of the polarizing plate 45 on the light exit side is indicated. Moreover, the rubbing direction of the two alignment films 26 and 46, and the direction of the transmission axis of the polarizing plate 45 are set approximately parallel to the extending direction (longitudinal direction of the comb) of the pixel electrode 22, in a range where the turning direction of the liquid crystal molecule is defined.

Next, the operation of the display device with the touch sensor having the above configuration will be described.

Figure 11:
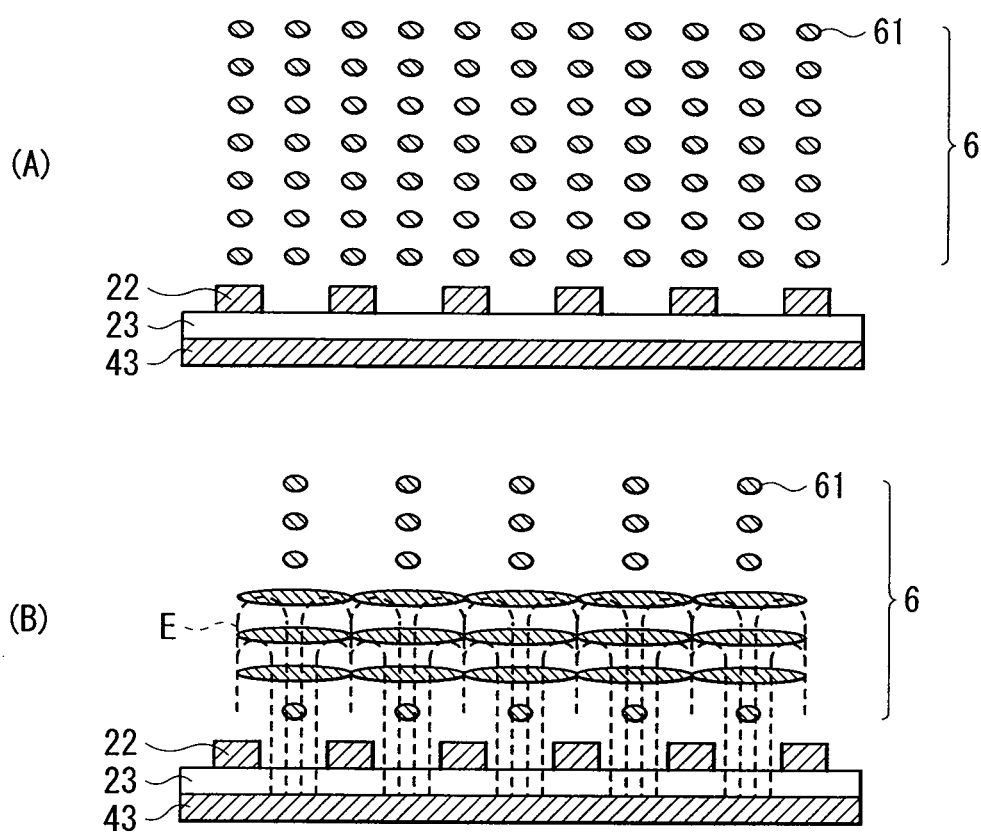
FIG. 11 Cross-sectional views for explaining operation of the display device with the touch sensor illustrated in FIG. 9.

Here, first, with reference to FIGS. 10 and 11, the display operation principle of the liquid crystal element of FFS mode will be simply described. Here, FIG. 11 illustrates the enlarged cross-section of the main part of the liquid crystal element. In these views, (A) illustrates the state of the liquid crystal element when no electric field is applied, and (B) illustrates the state of the liquid crystal element when the electric field is applied.

In the state where the voltage is not applied between the common electrode 43 and the pixel electrode 22 (FIGS. 10(A) and 11(A)), the axis of the liquid crystal molecule 61 constituting the liquid crystal layer 6 is orthogonal to the transmission axis of the polarizing plate 24 on the light incident side, and becomes parallel to the transmission axis of the polarizing plate 45 on the light exit side. For this reason, an incident light h transmitting the polarizing plate 24 on the light incident side reaches the polarizing plate 45 on the light exit side, without generating a phase difference in the liquid crystal layer 6, and is absorbed in the polarizing plate 45, thereby black is displayed. On the other hand, in the state where the voltage is applied between the common electrode 43 and the pixel electrode 22 (FIGS. 10(B) and 11(B)), the alignment direction of the liquid crystal molecule 61 is turned in the oblique direction with respect to the extending direction of the pixel electrode 22, with a lateral electric field E generated between the pixel electrodes. At this time, the electric field intensity when white is displayed is optimized so that the liquid crystal molecule 61 located in middle of the thickness direction of the liquid crystal layer 6 is turned approximately 45 degrees. Thereby, the phase difference is generated in the liquid crystal layer 6 while the incident light h transmits the liquid crystal layer 6, after transmitting the polarizing plate 24 on the light incident side. Thus, the incident light h becomes a straight-line polarized light which is turned 90 degrees, and transmits the polarizing plate 45 on the light exit side, thereby white is displayed.

Next, the display control operation and the touch detection operation of the display device with the touch sensor will be described. These operations are similar to those in the first embodiment described above, thereby the descriptions are appropriately omitted.

The display driver (not illustrated in the figure) in the pixel substrate 2A line-sequentially supplies the common drive signal Vcom to each of the electrode patterns in the common electrode 43. The display driver also supplies the pixel signal to the pixel electrode 22 through the source line, and line-sequentially controls the switching of the TFT in each of the pixel electrodes through the gate line, in synchronization with the supply of the pixel signal. Thereby, the electric field is applied to the liquid crystal layer 6 for each of the pixels, in the lateral direction (direction parallel to the substrate) defined by the common drive signal Vcom and each of the pixel signals, and the liquid crystal state is modulated. In this manner, the display is performed with the so-called inversion drive.

On the other hand, on the opposed substrate 4A side, when the common drive signal Vcom is time-divisionally sequentially applied to each of the electrode patterns in the common electrode 43, charge/discharge is performed on each of the capacitive elements C1 of one line formed at the intersection portion of the electrode pattern in the common electrode 43, to which the common drive voltage Vcom is applied, and each of the electrode patterns in the detection-electrode-for-the-sensor 44. The detection signal Vdet with the magnitude in accordance with the capacity of the capacitive element C1 is output from each of the electrode patterns in the detection-electrode-for-the-sensor 44. Under the conditions where the user's finger is not in contact with the surface of the opposed substrate 4A, the magnitude of this detection signal Vdet is approximately constant. When the user's finger touches any place on the surface of the opposed substrate 4A, the capacitive element C2 by the finger is added to the capacitive element C1 which is originally formed in that touched place. As a result, the value of the detection signal Vdet when that touched place is scanned becomes small, in comparison with the detection signal Vdet in other places. The detection circuit 8 (FIG. 6) compares this detection signal Vdet with the threshold voltage Vth. When the detection signal Vdet is equal to or smaller than the threshold voltage Vth, the detection circuit 8 determines that place as the touched place. This touched place is determined with the application timing of the common drive signal Vcom, and the detection timing of the detection signal Vdet which is equal to or smaller than the threshold voltage Vth.

In this manner, according to the present embodiment, similarly to the case of the above-described first embodiment (FIG. 5), the capacitance type touch sensor has the configuration in which the common electrode 43 which is originally provided in the liquid crystal display element is also used as one of the pair of electrodes for the touch sensor, including the drive electrode and the detection electrode, and the common drive signal Vcom as the drive signal for display is used in common for the drive signal for the touch sensor. Thus, the newly-provided electrode is only the detection-electrode-for-the-sensor 44, and it is unnecessary to newly prepare a drive signal for the touch sensor. Therefore, the configuration is simple.

In particular, in the present embodiment, since the common electrode 43 as the drive electrode for the touch sensor is arranged on the pixel substrate 2 side (on the TFT substrate 21), it is extremely easy to supply the common drive signal Vcom from the TFT substrate 21 to the common electrode 43, and necessary circuits and electrode patterns, and wirings or the like may be collected in the pixel substrate 2. Therefore, integration of the circuits is realized.

Thus, a supply path (contact conductive pillar 7) of the common drive signal Vcom from the pixel substrate 2 side to the opposed substrate 4 side, which is necessary in the first embodiment described above (FIG. 5), is unnecessary, and the configuration is more simple.

Figure 12:
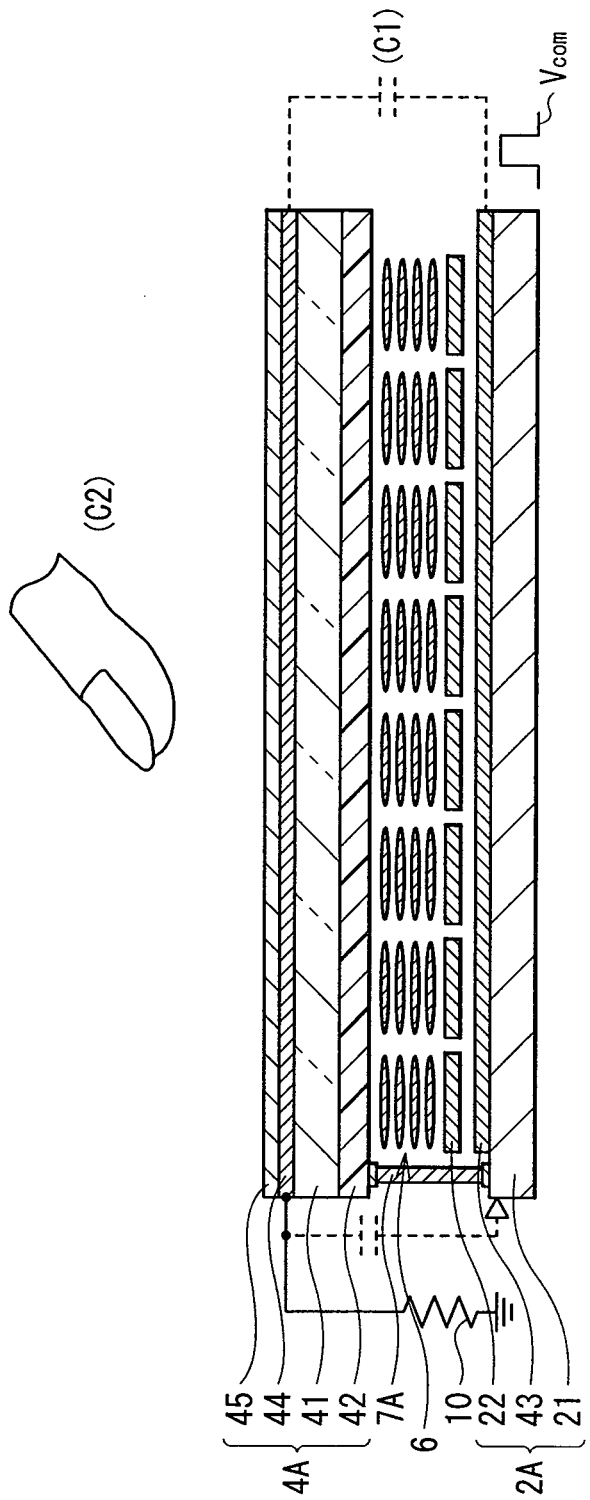
FIG. 12 A cross-sectional view indicating a specific example of the configuration of the display device with the touch sensor illustrated in FIG. 9.

In addition, although the detection circuit 8 (FIG. 6) may be formed in the peripheral region (the non-display region or the frame region) on the opposed substrate 4, the detection circuit 8 is preferably formed in the peripheral region on the pixel substrate 2. When the detection circuit 8 is formed on the pixel substrate 2, integration of the detection circuit 8 and various circuit elements for display control or the like, which are originally formed on the pixel substrate 2, is realized. In this case, for example, as illustrated in FIG. 12, a contact conductive pillar 7A is formed in the peripheral region, and the detection circuit 8 (not illustrated in the figure) formed in the pixel substrate 2, and the surface of the color filter 42 in the opposed substrate 4 are connected, thereby forming a capacitive coupling path between the detection-electrode-for-the-sensor 44, and the detection circuit 8. The detection signal Vdet may be transmitted from the detection-electrode-for-the-sensor 44 to the detection circuit 8 through this capacitive coupling path. However, in this case, since the detection-electrode-for-the-sensor 44 is in the floating state, it is preferable to connect the detection-electrode-for-the-sensor 44 to the ground through a high-resistance 10, to avoid this situation. Grounding the detection-electrode-for-the-sensor 44 in this manner brings a merit, also from the viewpoint of releasing static electric charge to the ground.

[Modification]

In the second embodiment, the detection-electrode-for-the-sensor 44 is provided on the surface side (side opposite from the liquid crystal layer 6) of the glass substrate 41. However, a modification is possible as follows.

Figure 13:
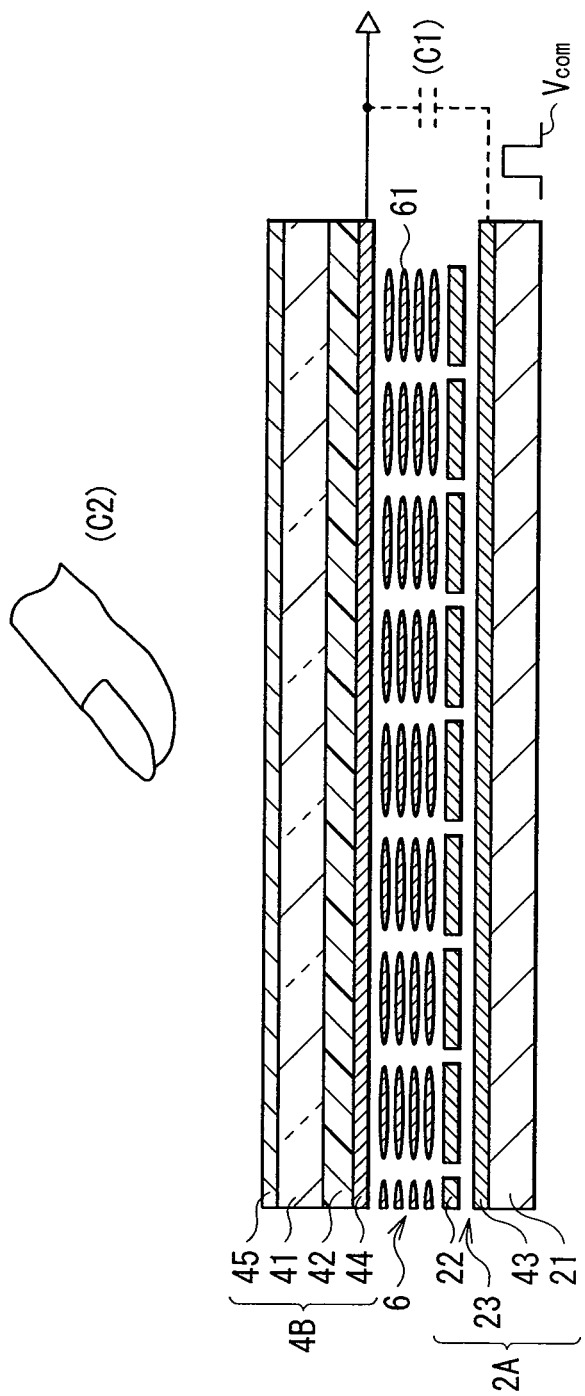
FIG. 13 A cross-sectional view indicating a modification of the display device with the touch sensor illustrated in FIG. 9.

For example, as illustrated in FIG. 13, the detection-electrode-for-the-sensor 44 may be provided on the liquid crystal layer 6 side, in comparison with the color filter 42.

Figure 14:
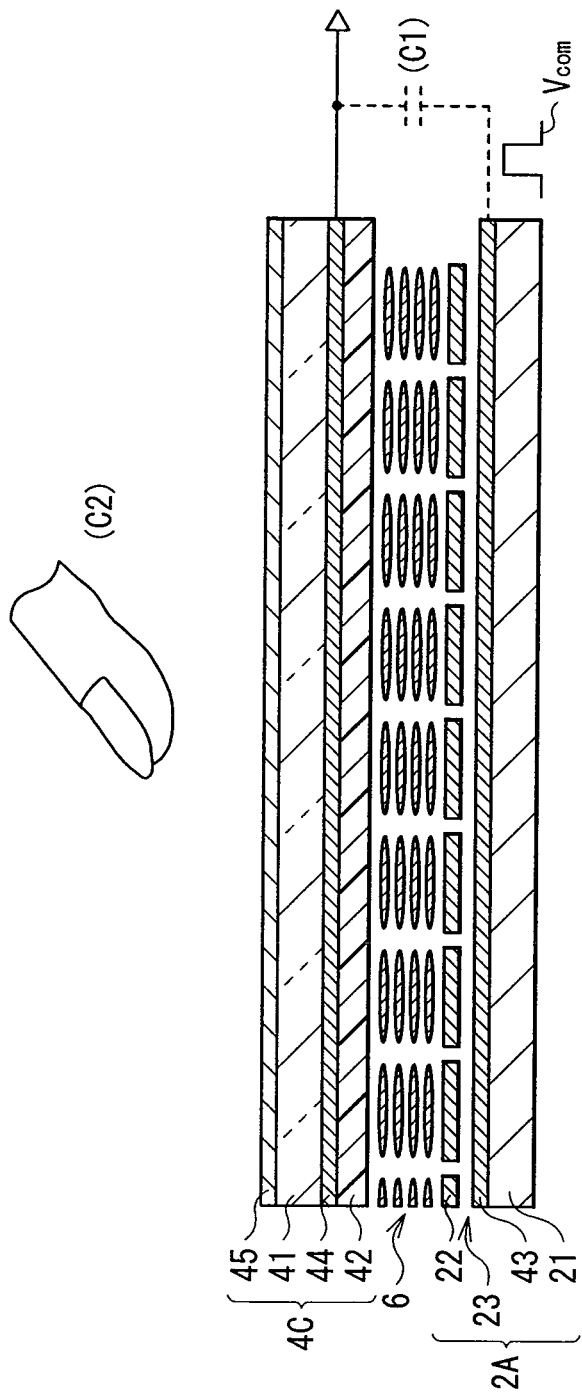
FIG. 14 A cross-sectional view indicating another modification of the display device with the touch sensor illustrated in FIG. 9.
Figure 15:
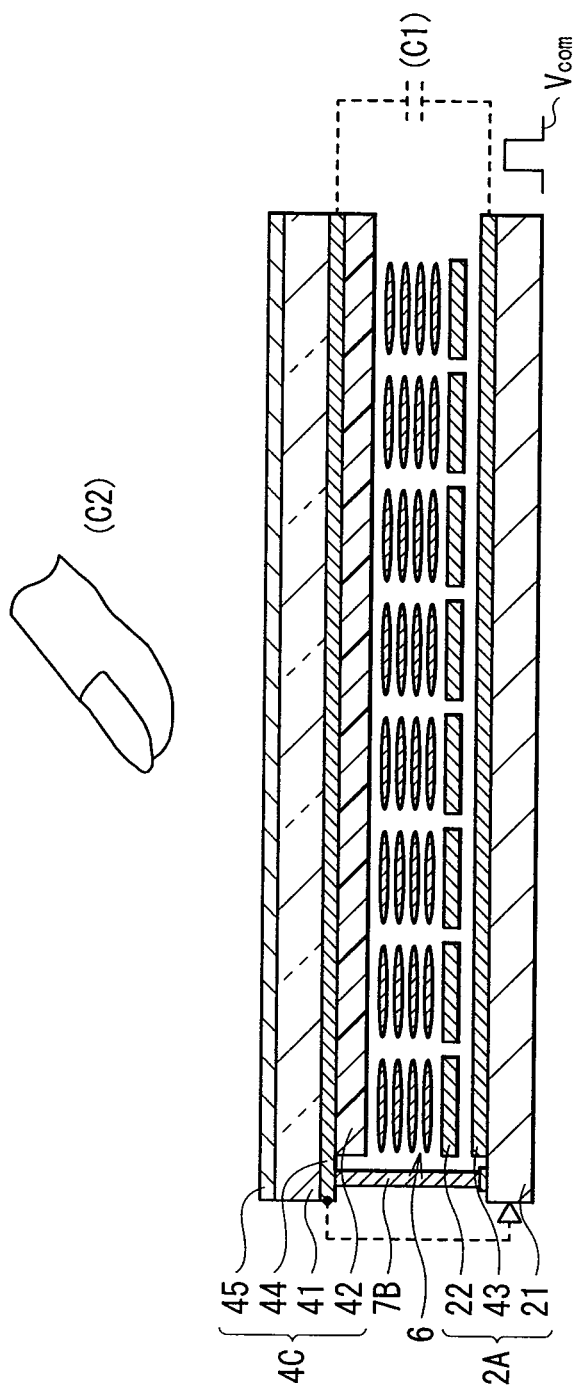
FIG. 15 A cross-sectional view indicating a specific example of the configuration of the display device with the touch sensor illustrated in FIG. 14.

Alternatively, as illustrated in FIG. 14, the detection-electrode-for-the-sensor 44 is preferably provided between the glass substrate 41 and the color filter 42. In the case of the lateral electric field mode, when there is the electrode in the vertical direction, the electric field is applied in the vertical direction, and the view angle or the like is highly deteriorated due to the rising of the liquid crystal. When the detection-electrode-for-the-sensor 44 is disposed with the dielectric such as the color filter 42 in between, this issue is highly improved. In this case, for example, as illustrated in FIG. 15, the detection circuit 8 (not illustrated in the figure) formed in the pixel substrate 2, and the detection-electrode-for-the-sensor 44 in the opposed substrate 4 are connected with a contact conductive pillar 7B. Thereby, a conductive path is formed between the detection-electrode-for-the-sensor 44, and the detection circuit 8, and the detection signal Vdet may be transmitted from the detection-electrode-for-the-sensor 44 to the detection circuit 8 through this conductive path.

Third Embodiment

Figure 16:
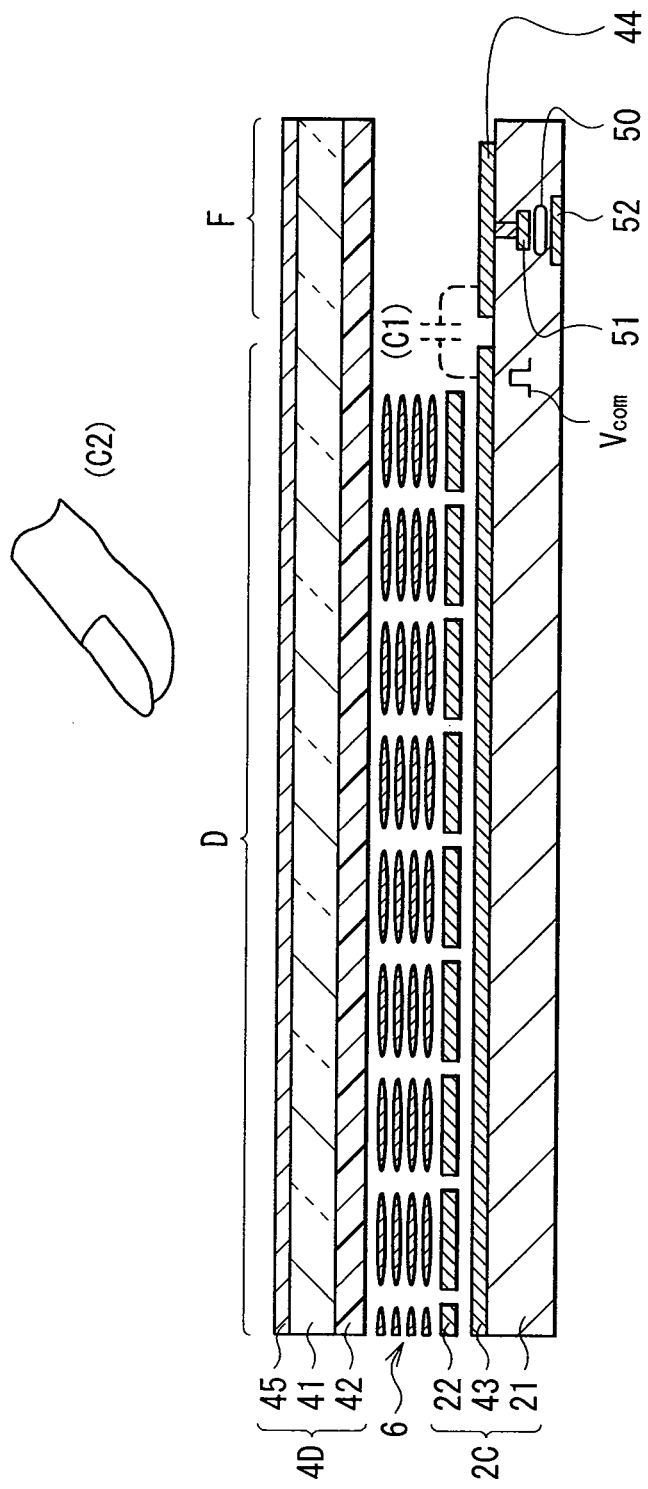
FIG. 16 A cross-sectional view illustrating the schematic cross-sectional configuration of the display device with the touch sensor according to a third embodiment of the present invention.
Figure 17:
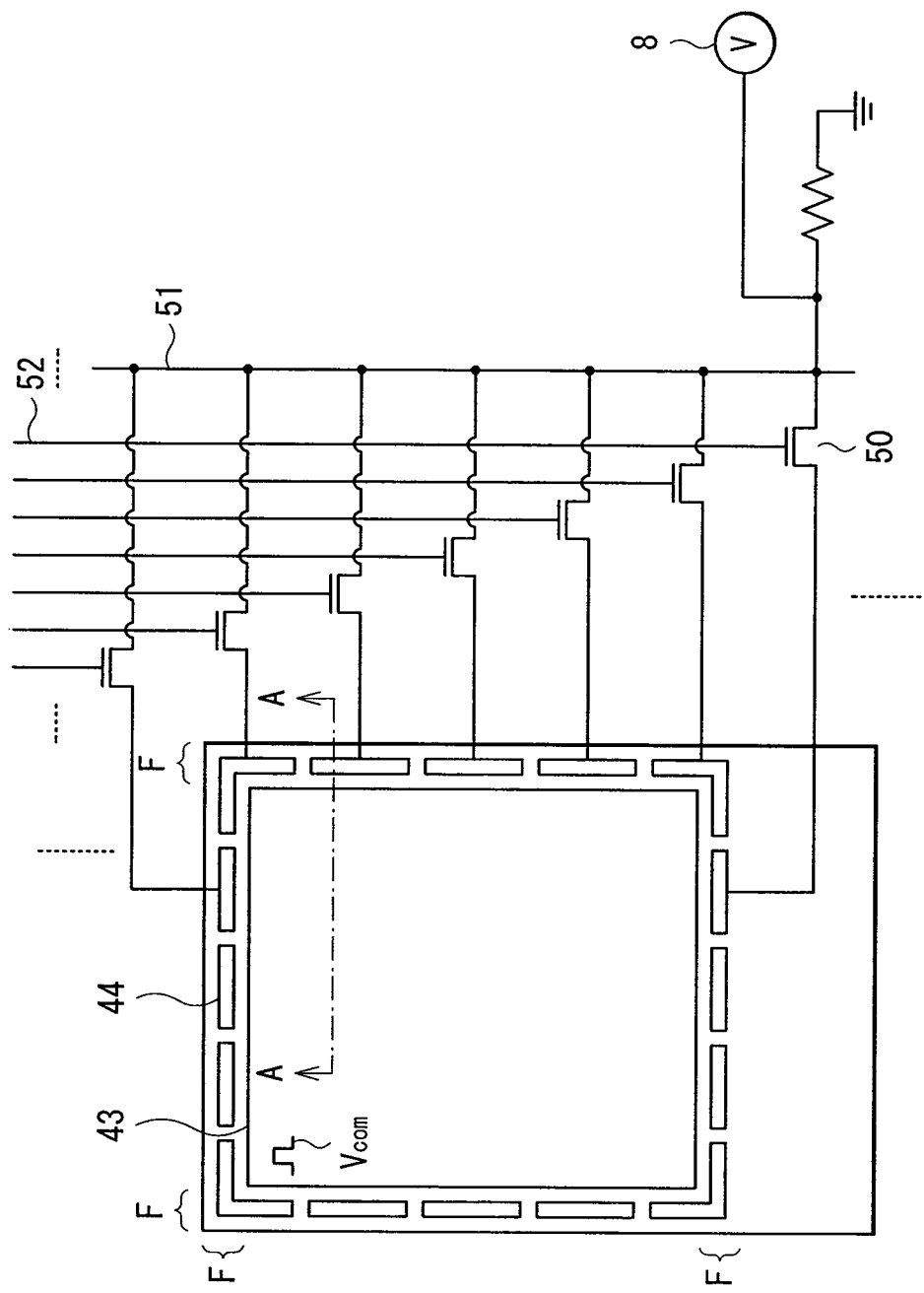
FIG. 17 A plan view indicating the schematic plan configuration of the display device with the touch sensor illustrated in FIG. 16.

In the first embodiment and the second embodiment described above, the detection-electrode-for-the-sensor 44 is disposed in the display region. However, in the present embodiment, as illustrated in FIGS. 16 and 17, the detection-electrode-for-the-sensor 44 is provided in a region (frame region F) surrounding a display region D. FIG. 17 illustrates the plan configuration of the display device with the touch sensor of the present embodiment, and FIG. 16 illustrates the configuration as viewed from the direction of A-A arrow in FIG. 17.

In this display device with the touch sensor, both the common electrode 43 and the detection-electrode-for-the-sensor 44 are formed on a pixel substrate 2B side, and none of the common electrode 43 and the detection-electrode-for-the-sensor 44 are formed on the opposed substrate 4 side. Specifically, the common electrode 43 is formed on the TFT substrate 21, in the whole display region D. On the other hand, the detection-electrode-for-the-sensor 44 is formed on the TFT substrate 21, only in the frame region F. The detection-electrode-for-the-sensor 44 is formed as a plurality of individual electrode groups. Each of the individual electrodes is, for example, assigned as an operation button corresponding to various functions of the display application. Each of the individual electrodes in the detection-electrode-for-the-sensor 44 is connected to a detection signal line for the sensor 51 through a source and a drain of a TFT 50 which performs switching by a control from a scanning signal line 52. The scanning signal line 52 and the TFT 50 are formed at the same time as formation of the drive circuit of the pixels, and are configured so as to sequentially time-divisionally scan each of the individual electrodes. Thereby, it is unnecessary to have the division number of the detection circuits, and this is extremely efficient.

In the display device with the touch sensor having such a configuration, each of the individual electrodes in the detection-electrode-for-the-sensor 44 is disposed on the same plane as a formation plane of the common electrode 43, separately from the common electrode 43. Thus, the capacitive coupling in the lateral direction is generated between each of the individual electrodes in the detection-electrode-for-the-sensor 44, and the common electrode 43, and the capacitive element C1 is formed. The common drive signal Vcom is applied to the common electrode 43 (in the example of FIG. 17, a single electrode extending all over), and the TFT 50 is sequentially turned on with the scanning signal line 52. Thereby, the detection signal Vdet is time-divisionally taken out from each of the individual electrodes in the detection-electrode-for-the-sensor 44. The taken-out detection signal Vdet is input to the detection circuit 8 (not illustrated in FIG. 16) having the configuration illustrated in FIG. 6, through the detection signal line for the sensor 51.

Under the conditions where the user's finger is not in contact with the surface of an opposed substrate 4D, the magnitude of this detection signal Vdet is approximately constant. On the other hand, under the conditions where the user's finger is in contact with any place on the surface of the opposed substrate 4D (position corresponding to any of the individual electrodes in the detection-electrode-for-the-sensor 44), the capacitive element C2 by the finger is added to the capacitive element C1 which is originally formed in that touch place. As a result, the value of the detection signal Vdet when that touched place is scanned becomes small. The detection circuit 8 (FIG. 6) compares this detection signal Vdet with the threshold voltage Vth. When the detection signal Vdet is equal to or smaller than the threshold voltage Vth, the detection circuit 8 determines that place as the touched place. This touched place may be determined with the scanning timing of the individual electrodes in the detection-electrode-for-the-sensor 44, with the scanning signal, and the detection timing of the detection signal Vdet which is equal to or smaller than the threshold voltage Vth.

In this manner, according to the present embodiment, since both the common electrode 43 and the detection-electrode-for-the-sensor 44 are disposed on the pixel substrate 2 side, it is possible to easily form a transmission path of the common drive signal Vcom between a sensor drive circuit (not illustrated in the figure) formed in the TFT substrate 21, and the common electrode 43, and a transmission path of the detection signal Vdet between the detection-electrode-for-the-sensor 44, and the detection circuit 8, without the contact conductive pillar in between. Therefore, it is extremely easy to collectively integrate the common electrode 43 and the detection-electrode-for-the-sensor 44, the circuit for display, and the drive circuit and the detection circuit for the touch sensor, in the TFT substrate 21.

Figure 18:
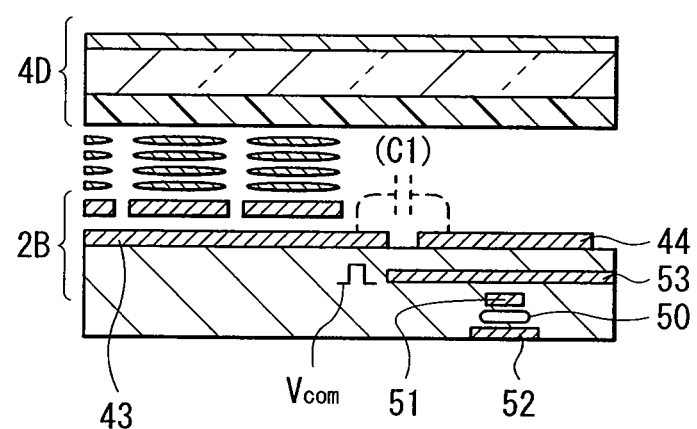
FIG. 18 A cross-sectional view of the main part, indicating a modification of the display device with the touch sensor illustrated in FIG. 16.

In addition, like the present embodiment, in the case where the common electrode 43 and the detection-electrode-for-the-sensor 44 are disposed side by side, and the capacitive element C1 by the capacity coupling in the lateral direction is formed between the common electrode 43 and the detection-electrode-for-the-sensor 44, there is a case where a noise transfer from the common electrode 43 to the circuit element (TFT 50 or the like) in the TFT substrate 21 becomes an issue. Thus, to prevent this, as illustrated in FIG. 18, it is preferable to provide a shield electrode 53 below the detection-electrode-for-the-sensor 44. However, as the above-described shield layer, it is also possible to divert a transparent electrode film constituting a metal wiring and a pixel electrode, without particularly providing a new special layer.

[Modification]

Figure 19:
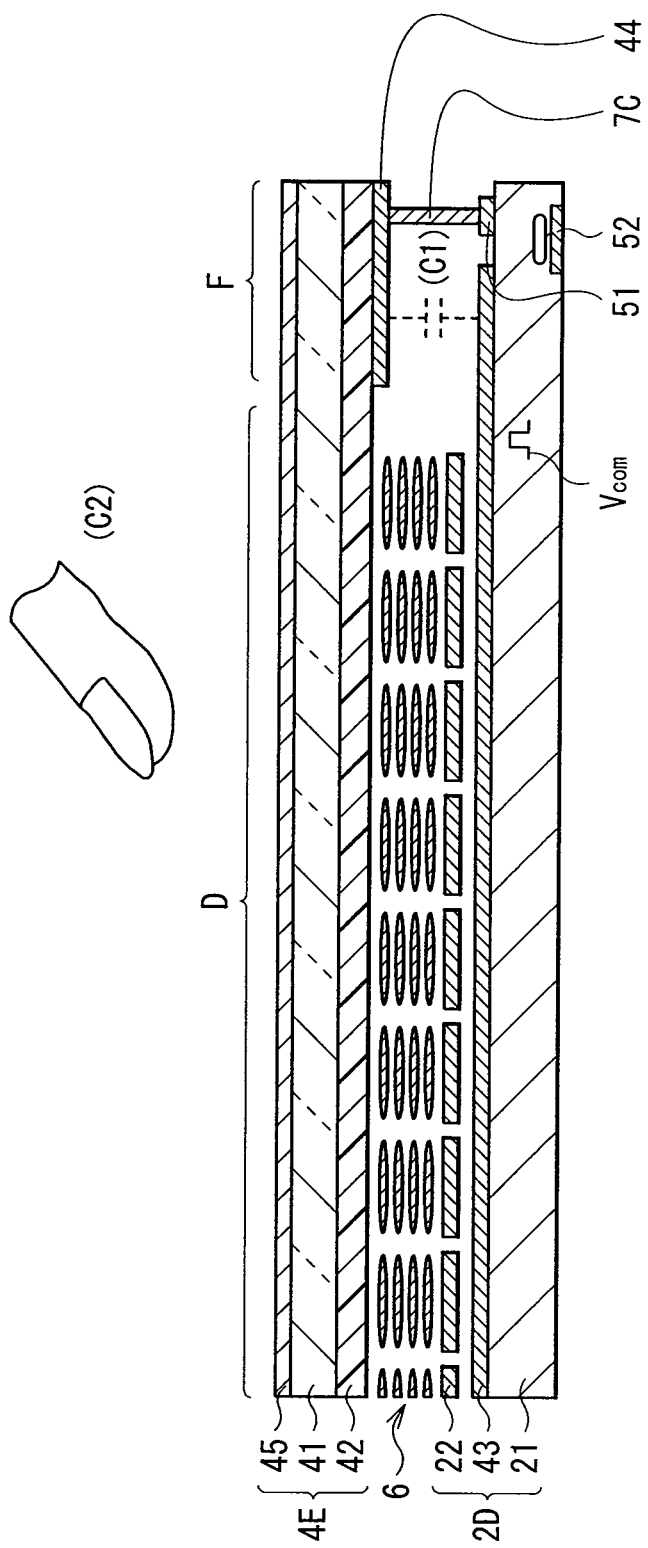
FIG. 19 A schematic cross-sectional view indicating another modification of the display device with the touch sensor illustrated in FIG. 16.

In the third embodiment described above, the common electrode 43 and the detection-electrode-for-the-sensor 44 are disposed side by side on the TFT substrate 21, and the capacitive element C1 is formed by the capacitive coupling in the lateral direction. However, unlike this, it is also possible to form the capacitive element C1 by the capacity coupling in the vertical direction. For example, as illustrated in FIG. 19, the common electrode 43 extends to not only the display region D on the TFT substrate 21, but also to the frame region F, and the detection-electrode-for-the-sensor 44 is formed so as to face the common electrode 43 in the frame region F of the TFT substrate 21, the detection-electrode-for-the-sensor 44 serving as an electrode layer in a layer level different from that of the common electrode 43. Thereby, the capacitive element C1 is formed between the common electrode 43 and the detection-electrode-for-the-sensor 44. In this case, a contact pillar 7C connecting the detection-electrode-for-the-sensor 44, and the TFT substrate 21 is provided, and thereby the detection signal Vdet from the detection-electrode-for-the-sensor 44 may be transmitted to the TFT substrate 21 side.

As it is clear from the descriptions of the first embodiment to the third embodiment, in accordance with the type of the liquid crystal layer as the display function layer, it may be arbitrarily selected whether the detection-electrode-for-the-sensor 44 is formed on the opposed substrate 4 side, or on the pixel substrate 2 side. Therefore, there is a merit that flexibility of the configuration design is high.

Hereinbefore, although the present invention is described with some embodiments, the present invention is not limited to these embodiments, and various modifications are possible. For example, in the second embodiment and the third embodiment described above, the example of the liquid crystal element of FFS mode as the lateral electric field mode is described. However, similarly to this, the liquid crystal of IPS mode may be applied.

In the embodiments described above, the display device using the liquid crystal display element as the display element is described. However, the present invention is also applicable to a display device using other display elements, for example, organic EL elements.

What is claimed is:

1. A touch sensor device comprising:
   a substrate having four sides and a peripheral area along the four sides;
   a driving electrode on the substrate;
   a plurality of touch electrodes arranged within the peripheral area and along the four sides of the substrate, the touch electrodes being disposed between the driving electrode and edges of the substrate and surrounding the driving electrode, in a plan view;
   a plurality of wires each of which is coupled to a respective one of the touch electrodes; and
   touch detection circuitry that receives detection signals from the touch electrodes through their respective wires,
   wherein,
   an area of the driving electrode is larger than an area of each of the of the touch electrodes, and
   each touch electrode is spaced apart from the driving electrode.

2. The touch sensor device of claim 1, wherein the driving electrode is a single electrode overlapping a continuous area of the substrate between touch electrodes that are disposed along two opposite sides of the substrate.

3. The touch sensor device of claim 2, wherein the driving electrode and the touch electrodes are made of transparent conductive material.

4. The touch sensor device of claim 3, wherein the driving electrode is disposed on the substrate in a layer identical to a layer in which the touch electrodes are disposed.

5. The touch sensor device of claim 4, wherein one of the touch electrodes is arranged at a corner of the substrate and extends along two sides of the substrate, and another of the touch electrodes only extends along one side of the substrate.

6. A touch sensor device comprising:
   a substrate having four sides and a peripheral area along the four sides;
   a driving electrode that is a single electrode disposed on the substrate and that is surrounded by the peripheral area in a plan view;
   a plurality of touch electrodes arranged within the peripheral area and along the four sides of the substrate;
   a plurality of wires each of which is coupled to a respective one of the touch electrodes; and
   touch detection circuitry that receives detection signals from the touch electrodes through the respective wires,
   wherein,
   an area of the driving electrode is larger than an area of each of the touch electrodes, and
   each touch electrode is spaced apart from the driving electrode.

7. The touch sensor device of claim 6, wherein the driving electrode is disposed on the substrate in a layer identical to a layer in which the touch electrodes are disposed.

8. The touch sensor device of claim 7, wherein the driving electrode and the touch electrodes are made of transparent conductive material.

9. The touch sensor device of claim 8, wherein one of the touch electrodes is arranged at a corner of the substrate and extends along two sides of the substrate, and another of the touch electrodes only extends along one of the four sides of the substrate.

10. A touch sensor device comprising:
- a substrate having four sides and a peripheral area along the four sides;
- a driving electrode on the substrate;
- a plurality of touch electrodes arranged in the peripheral area and along the four sides of the substrate, the touch electrodes surrounding the driving electrode;
- a plurality of wires each of which is coupled to a respective one of the touch electrodes; and
- touch detection circuitry that receives detection signals from touch electrodes through the respective wires, wherein,
an area of the driving; electrode is larger than an area of each of the touch electrodes, and
each touch electrode is spaced apart from the driving electrode.

11. The touch sensor device of claim 10, wherein the driving electrode and the touch electrodes are made of transparent conductive material.

12. The touch sensor device of claim 10, wherein one of a touch electrode is arranged at a corner of the substrate and extends along two sides of the substrate, and another touch electrode only extends along one side of the substrate.

13. The touch sensor device of claim 10, wherein the driving electrode is a single electrode overlapping a continuous area of the substrate between touch electrodes that are disposed along two opposite sides of the substrate.

14. The touch sensor device of claim 10, wherein the driving electrode is disposed on the substrate in a layer identical to a layer in which the touch electrodes are disposed.

15. The touch sensor device of claim 1, wherein the touch electrodes do not overlap the driving electrode, in the plan view.

* * * * *